United States Patent [19]
Schmidt et al.

[11] Patent Number: 5,339,984
[45] Date of Patent: Aug. 23, 1994

[54] FASTENER ATTACHING APPARATUS HAVING MULTIPLE SOURCES OF FASTENER HARDWARE

[76] Inventors: Volker Schmidt, 4638 Todds Rd.; Erich A. Schmidt, 2415 Liberty Rd., both of Lexington, Ky. 40509

[21] Appl. No.: 128,636
[22] Filed: Sep. 29, 1993
[51] Int. Cl.⁵ .................................................. B65G 59/00
[52] U.S. Cl. ............................ 221/124; 221/238; 221/274; 227/18; 29/243.56
[58] Field of Search ............. 221/92, 93, 123, 126, 221/129, 224, 238, 124, 268, 274, 272, 9, 13; 227/18, 135, 15; 29/243.5, 243.56, 243.53

[56] References Cited

U.S. PATENT DOCUMENTS

| | | | |
|---|---|---|---|
| 3,114,477 | 12/1963 | Dixon | 221/238 |
| 4,596,349 | 6/1986 | Herten | 227/18 |
| 4,694,984 | 9/1987 | Altwicker | 227/109 |
| 4,923,099 | 5/1990 | Hasegawa et al. | 227/114 |
| 4,985,987 | 1/1991 | Schmidt et al. | 227/18 |
| 5,193,717 | 3/1993 | Rink et al. | 221/124 |

Primary Examiner—Kenneth W. Noland
Attorney, Agent, or Firm—Frank C. Leach, Jr.

[57] ABSTRACT

First and second complementary articles of hardware are fed to a single attaching station by first and second reciprocating feed-in fingers, respectively. Different types of first articles are selected during initial retraction of the first feed-in finger for advancement to the attaching station along a first path during advancement of the finger. Different types of second articles are selected during initial retraction of the second feed-in finger for advancement along a second path to the attaching station during advancement of the finger. During its retraction, the first finger is diverted from its first path at least when it would engage the first selected article. If the second selected article is disposed so as to be engaged by the second finger during its retraction, the second finger has a cooperating surface to cause it to move from the second path beneath the second selected article.

20 Claims, 14 Drawing Sheets

| FIG. 1A | FIG. 1B |

FASTENER ATTACHING APPARATUS HAVING MULTIPLE SOURCES OF FASTENER HARDWARE

This invention relates to a fastener attaching apparatus having more than one source of each of two articles forming a fastener and, more particularly, to a fastener attaching apparatus having more than one source of each of two articles forming a fastener in which each article may be selected and positioned for movement to a single attaching or setting station when a feed-in finger for each of the selected articles is retracted from the single attaching or setting station.

It has previously been suggested in U.S. Pat. No. 4,596,349 to Herten, U.S. Pat. No. 4,694,984 to Altwicker, and U.S. Pat. No. 4,923,099 to Hasegawa et al, for example, to have a plurality of sources of first articles of a fastener and a plurality of second articles of a fastener. Each type of the first article is complementary to one of the types of the second articles in each of the aforesaid patents.

The supply from two different sources of each of the first and second articles of a fastener enables two different types of fasteners to be attached to the same garment, for example, with one type of fastener being a male component of a snap fastener and the other type of fastener being a female component of the snap fastener. This avoids the necessity of two separate fastener attaching apparatuses being employed with one attaching the male component of a snap fastener, for example, to one part of a garment and the other attaching the female component of a snap fastener, for example, to another portion of the garment.

In each of the aforesaid patents, a specific type of the first articles is selected and transported to a passage or path from which each is advanced to a single attaching or setting station, and a specific type of the second articles, complementary to the selected type of the first article, is selected and transported to a passage or path from which each is advanced to the single attaching or setting station. In each of the aforesaid patents, feed means reciprocates in each of the passages, which is supplied with one of the articles from a source such as a hopper, for example. Until the feed means is retracted past the entrance to the passage of the feed chute from the source of the articles so that the feed means does not block communication of the feed chute with the passage, no article can be supplied to the specific passage.

Therefore, this arrangement requires precise timing when the article is selected and fed to each of the passages from one of the feed chutes for advancement by the feed means within the specific passage. To have as fast a throughput as possible, each of the aforesaid patents has a minimum time period for supply of each article to the passage since it is desired to have a minimum length of retraction of the feed means within the passage.

The fastener attaching apparatus of the present invention overcomes the disadvantages of the aforesaid patents by not requiring the article to be disposed in a passage or path for advancement by the feed means only after the feed means has been retracted past where the article is supplied to the passage. Instead, the fastener attaching apparatus of the present invention is capable of having the selected article fed to the passage from which it is advanced by the feed means to the single attaching or setting station as soon as the feed means begins its retraction from the single attaching or setting station. Accordingly, the time period during which the article is supplied to the passage is not critical as in each of the aforesaid patents. Furthermore, the throughput of the fastener attaching apparatus of the present invention is about 40% faster than presently available fastener attaching apparatuses.

The fastener attaching apparatus of the present invention accomplishes the supply of the next selected article to the passage during retraction of the feed means through retracting the feed means along a different path than that in which it was advanced to the single attaching or setting station. Thus, there is no need for any delay time when the feed means is advanced after completing its retraction, and there is always an article present in the passage for advancement by the feed means.

An object of this invention is to provide a fastener attaching apparatus in which at least two different types of first articles and two different types of second articles may be selected for use with each of the types of the first articles being complementary to one of the second articles.

Another object of this invention is to provide a fastener attaching apparatus in which the articles forming the fastener are supplied at a faster rate than presently available fastener attaching apparatuses having more than one type of each article.

Other objects of this invention will be readily perceived from the following description, claims, and drawings.

This invention relates to a cyclically operated attaching apparatus for attaching complementary first and second articles of hardware to each other at a single attaching station. The apparatus includes a plurality of first sources with each having a different type of first articles and a plurality of second sources with each having a different type of second articles and each type of the second articles being complementary to a particular type of the first articles.

First transport means transports each of the first articles of one type from one of the first sources, and second transport means transports each of the first articles of another type from another of the first sources. Each of the first articles from each of the first and second transport means is received by first receiving means with first article selecting means selecting the next of the first articles from one of the first sources for supply to the first receiving means.

Third transport means transports each of the second articles of one type from one of the second sources, and fourth transport means transports each of the second articles of another type from another of the second sources with each of the second articles from the third and fourth transport means being received at second receiving means. Second article selecting means selects the next of the second articles from one of the second sources for supply to the second receiving means. The first and second article selecting means select complementary types of first and second articles.

Each of the selected first articles at the first receiving means is fed by feeding means to the single attaching station by advancing each of the selected first articles from the first receiving means along a first path to the single attaching station. The first feed means includes reciprocating means movable along the first path for engaging the selected first article at the first receiving means during advancement of the reciprocating means towards the single attaching station.

The reciprocating means is retracted from the single attaching station along a second path, different from the first path, so that the reciprocating means does not engage the next selected first article at the first receiving means during its retraction. The first article selecting means is effective after the reciprocating means of the first feed means has advanced the selected first article from the first receiving means to enable the next selected first article to be received at the first receiving means from one of the first and second transport means.

Second feed means feeds each of the selected second articles at the second receiving means to the single attaching station by advancing the selected second article from the second receiving means along a third path to the single attaching station. The second feed means includes reciprocating means movable along the third path for engaging the selected second article at the second receiving means during advancement of the reciprocating means along the third path towards the single attaching station with the second article selecting means being effective after the reciprocating means of the second feed means has advanced the selected second article from the second receiving means to enable the next selected second article to be received at the second receiving means from one of the third and fourth transport means.

Preventing means prevents movement of the next selected second article by the reciprocating means of the second feed means during its retraction when the second article selecting means is effective at a time to cause the next selected second article to be engaged by the reciprocating means of the second feed means during its retraction so that the reciprocating means of the second feed means moves along a fourth path, different from the third path, during at least the portion of its retraction in which the next selected second article is engaged by the reciprocating means of the second feed means during its retraction.

This invention also relates to a cyclically operated attaching apparatus for attaching complementary first and second articles of hardware to each other at a single attaching station. The apparatus includes a plurality of first sources with each having a different type of first articles and a plurality of second sources with each having a different type of second articles and each type of the second articles being complementary to a particular type of the first articles.

First transport means transports each of the first articles of one type from one of the first sources, and second transport means transports each of the first articles of another type from another of the first sources. Each of the first articles from each of the first and second transport means is received by first receiving means with first article selecting means selecting the next of the first articles from one of the first sources for supply to the first receiving means.

Third transport means transports each of the second articles of one type from one of the second sources, and fourth transport means transports each of the second articles of another type from another of the second sources with each of the second articles from the third and fourth transport means being received at second receiving means. Second article selecting means selects the next of the second articles from one of the second sources for supply to the second receiving means. The first and second article selecting means select complementary types of first and second articles.

Each of the selected first articles at the first receiving means is fed by feeding means to the single attaching station by advancing each of the selected first articles from the first receiving means along a first path to the single attaching station. The first feed means includes reciprocating means movable along the first path for engaging the selected first article at the first receiving means during advancement of the reciprocating means towards the single attaching station.

The reciprocating means is retracted from the single attaching station along a second path, different from the first path, so that the reciprocating means does not engage the next selected first article at the first receiving means during its retraction. The first article selecting means is effective after the reciprocating means of the first feed means has advanced the selected first article from the first receiving means to enable the next selected first article to be received at the first receiving means from one of the first and second transport means.

Second feed means feeds each of the selected second articles at the second receiving means to the single attaching station by advancing the selected second article from the second receiving means along a third path to the single attaching station. The second feed means includes reciprocating means movable along the third path for engaging the selected second article at the second receiving means during advancement of the reciprocating means along the third path towards the single attaching station.

The second article selecting means is effective after the reciprocating means of the second feed means has advanced the selected second article from the second receiving means to enable the next selected second article to be received at the second receiving means from at least one of the third and fourth transport means before the reciprocating means of the second feed means reaches the second receiving means during retraction of the reciprocating means of the second feed means whereby the next selected second article is engaged by the reciprocating means of the second feed means during its retraction. Thus, the reciprocating means moves along a fourth path, different from the third path, during at least the portion of its retraction in which the next selected second article is engaged by the reciprocating means of the second feed means.

The attached drawings illustrate a preferred embodiment of the invention, in which:

FIG. 9 is a fragmentary top plan, partly in section, of a portion of the fastener attaching apparatus of FIGS. 1A and 1B with some parts omitted for clarity purposes and showing one type of a ring in solid lines in position as the selected ring and another type of ring in phantom lines in the position in which it would be disposed if selected;

Figure 13:
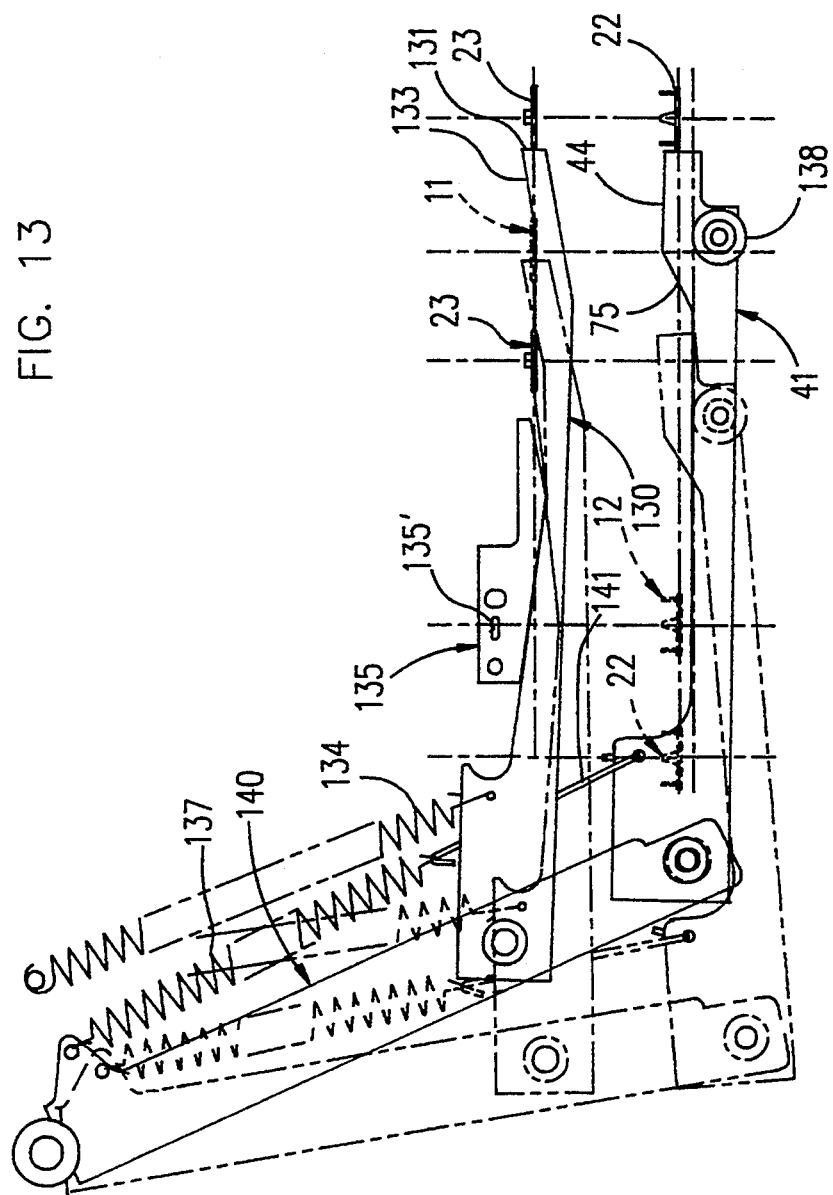
Figure 14:
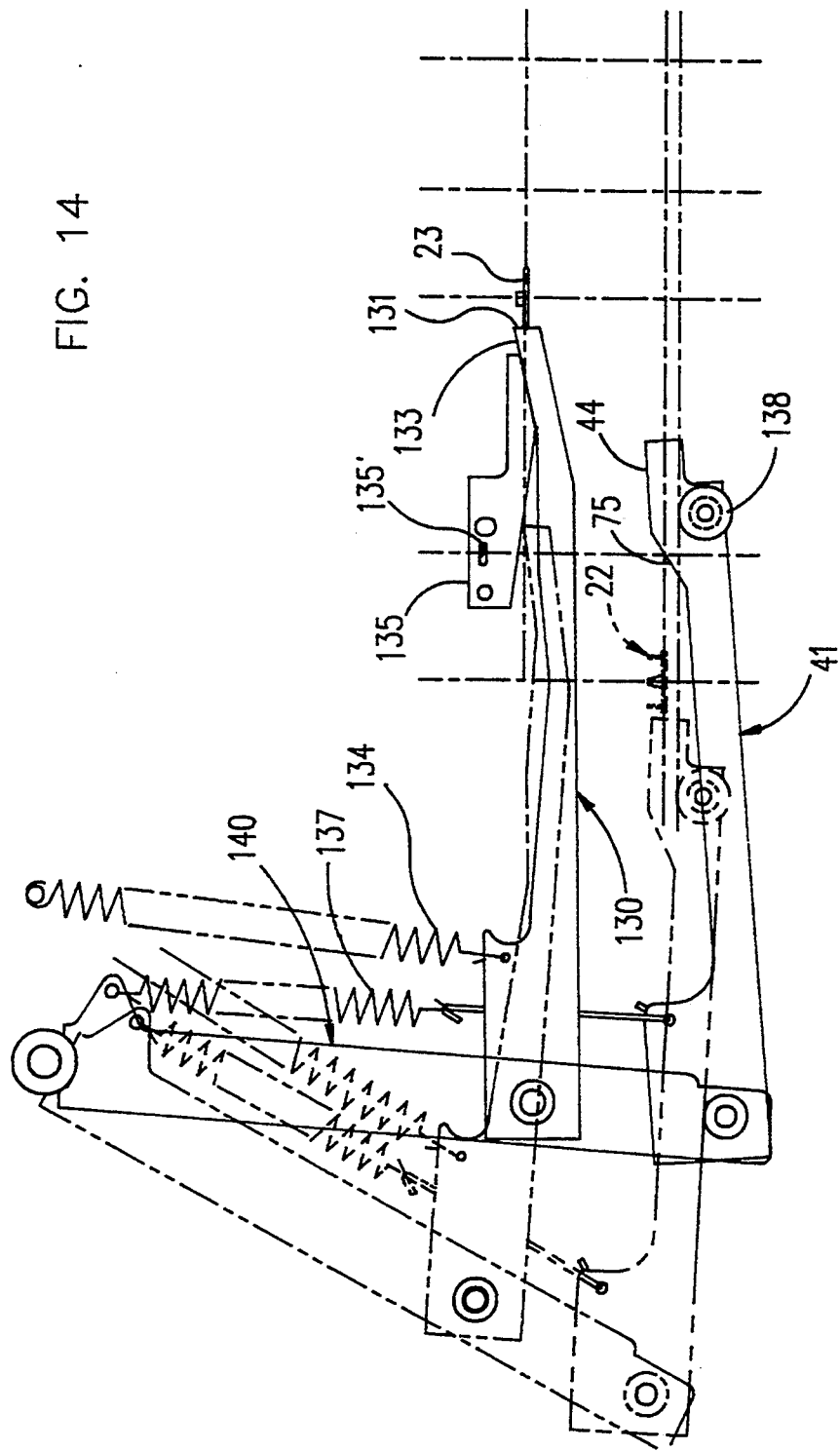
Figure 15:
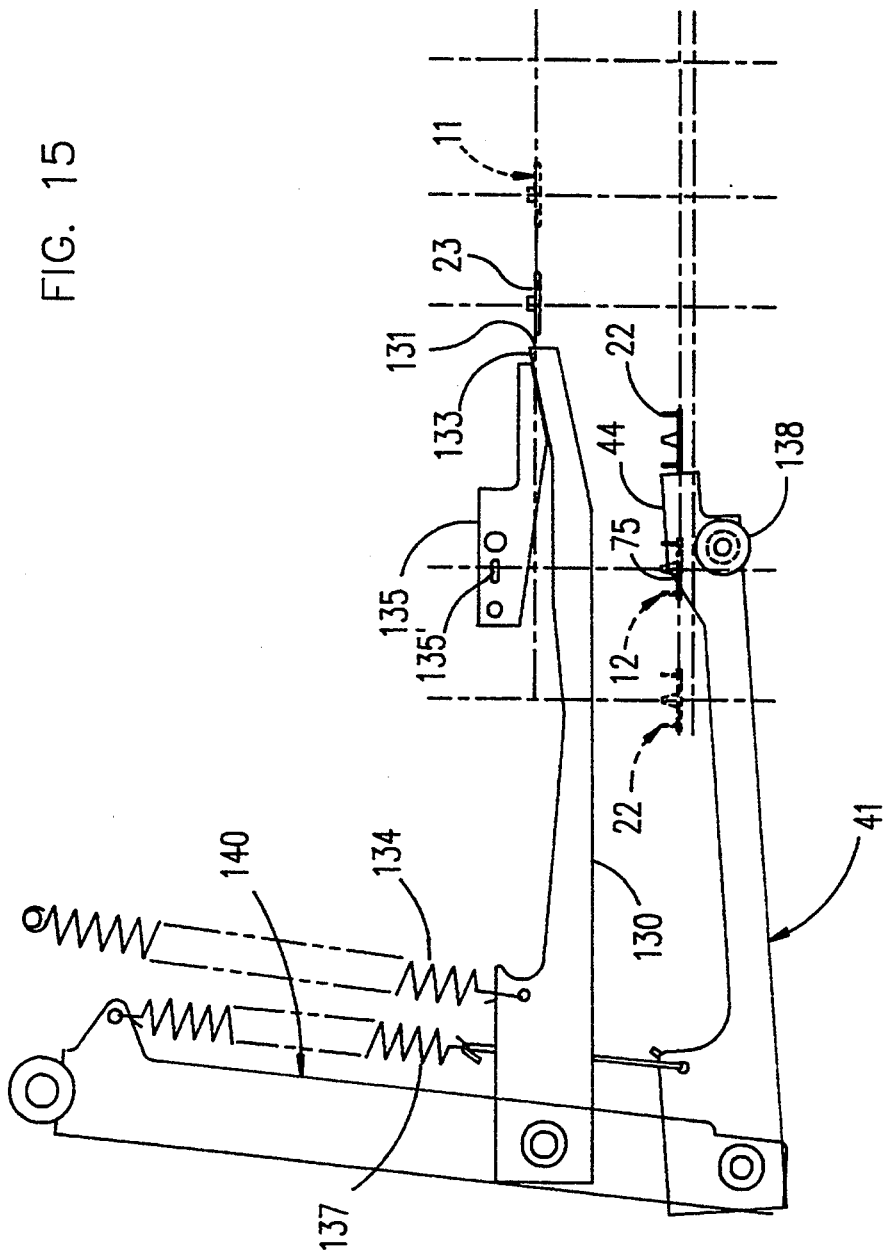
Figure 16:
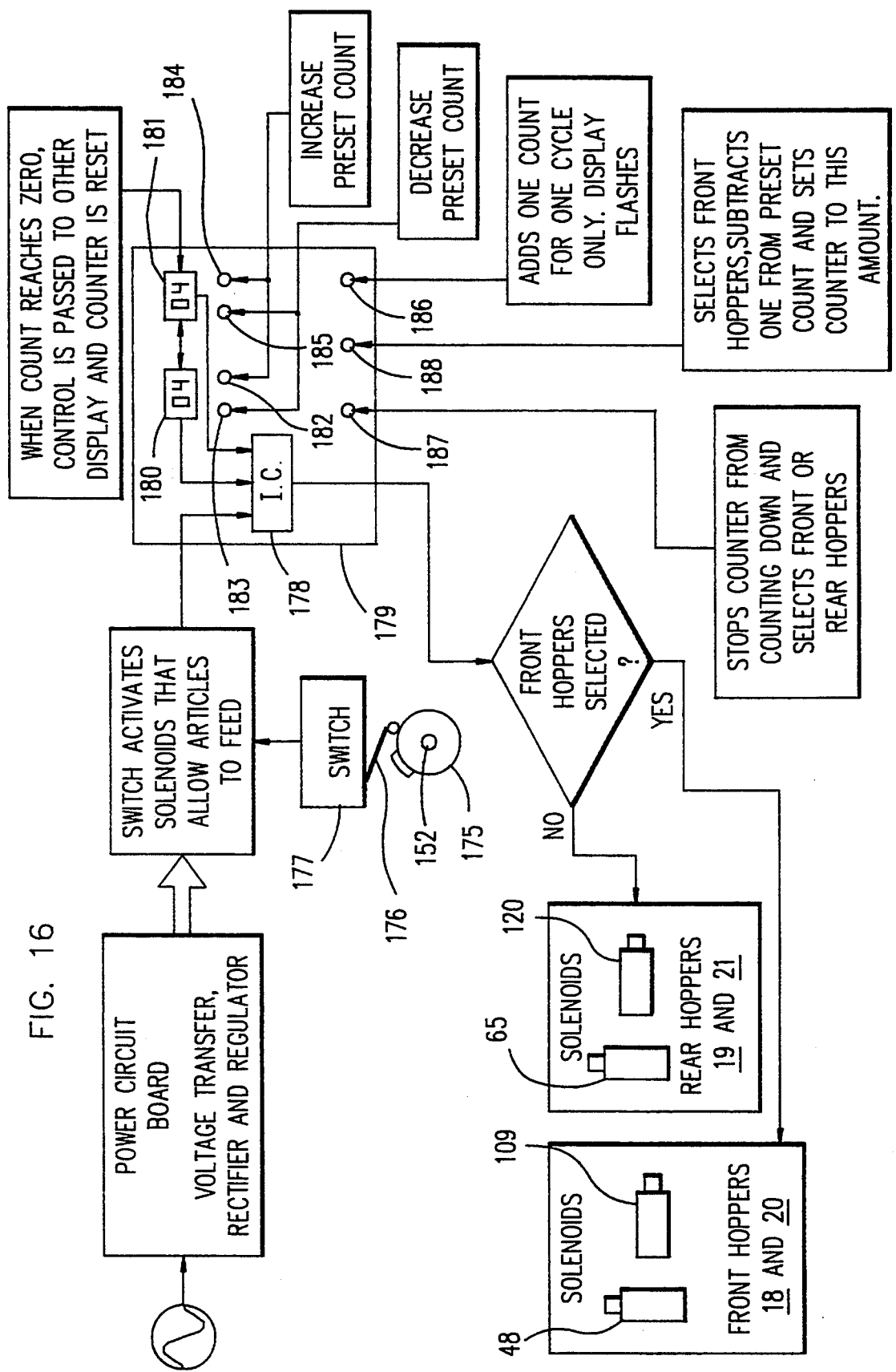

FIG. 13 is a schematic view of the two feed-in fingers and their relation to the locations at which the four articles are fed for feeding by the feed-in fingers with the solid line position showing the feed-in fingers at the start of a cycle of operation at which the feed-in fingers are fully advanced and the phantom line position showing the feed-in fingers with the feed-in fingers partially retracted;

FIG. 14 is a schematic view of the two feed-in fingers and their relation to the locations at which the four articles are fed for feeding by the feed-in fingers with the solid line position showing the feed-in fingers retracted beyond the positions of the two articles above the feed-in fingers and the phantom line position showing the feed-in fingers fully retracted;

FIG. 15 is a schematic view of the two feed-in fingers and their relation to the locations at which the four articles are fed for feeding by the feed-in fingers and showing the feed-in fingers advanced beyond the positions of the two articles between the feed-in fingers after the feed-in fingers have begun to advance one of the two selected articles; and FIG. 16 is a schematic block diagram showing a control system for use with the fastener attaching apparatus of the present invention.

Figure 1A:
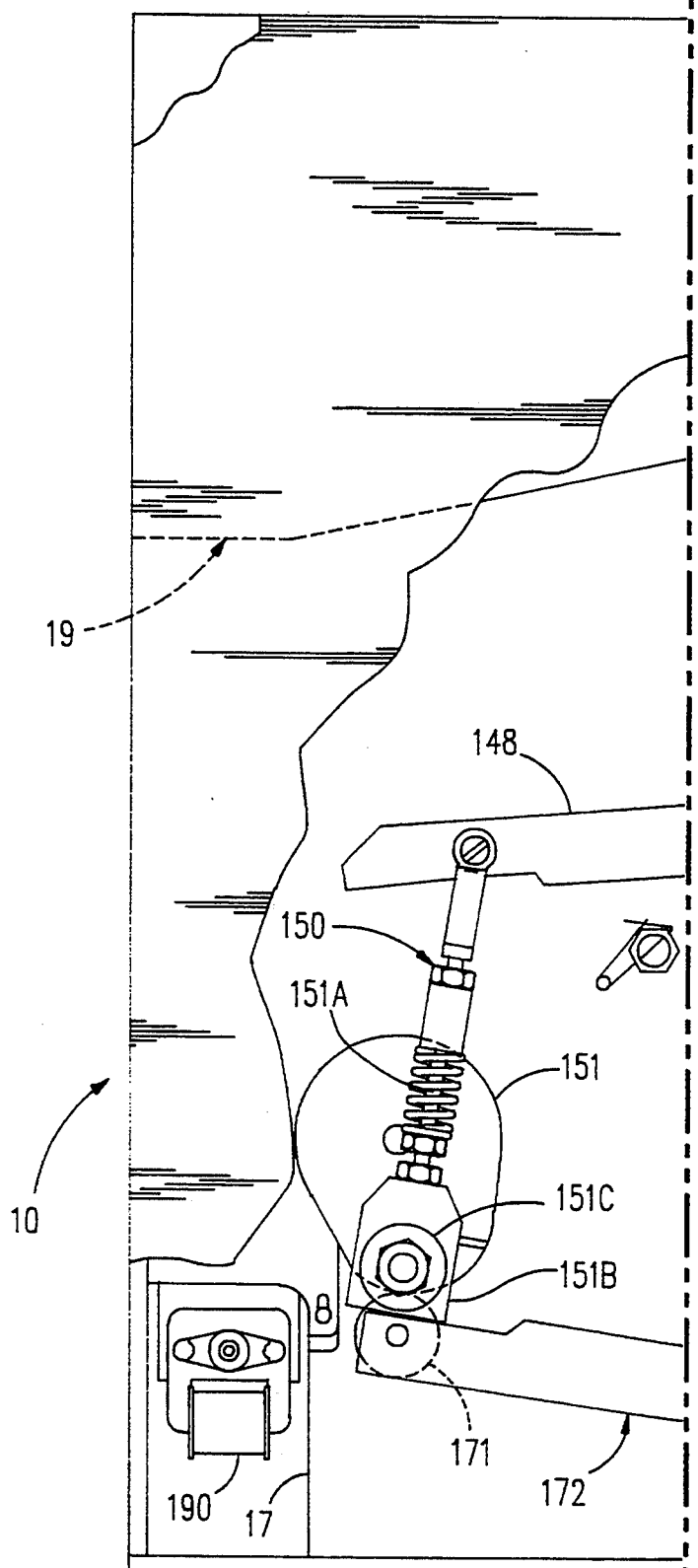
FIG. 1A is a left side elevational view of a portion of a fastener attaching apparatus of the present invention.
Figure 1:
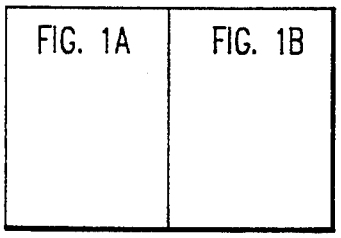
FIG. 1 is a block diagram showing the relationship of FIGS. 1A and 1B.
Figure 1B:
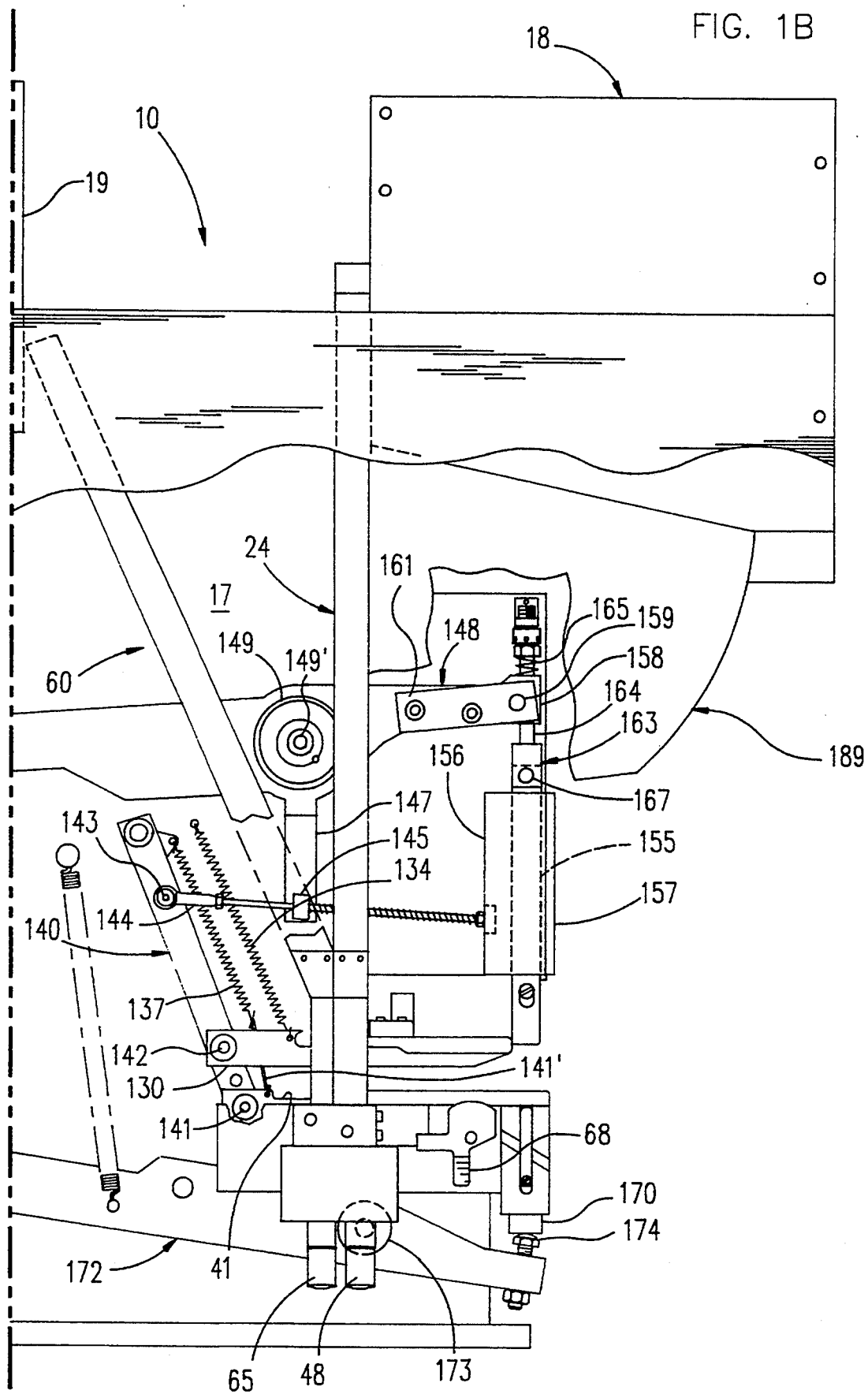
FIG. 1B is a left side elevational view of the remainder of the fastener attaching apparatus of FIG. 1A.
Figure 3:
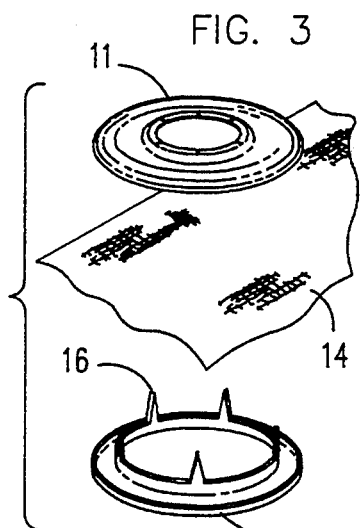
FIG. 3 is a perspective view of a socket, a ring having prongs to which the socket is to be attached, and a material through which the prongs pass when the socket and the ring are attached to each other by the fastener attaching apparatus of FIGS. 1A and 1B.
Figure 4:
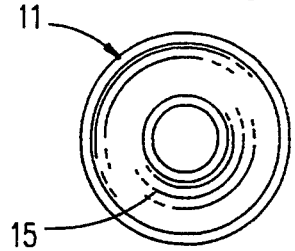
FIG. 4 is a plan view of one side of the socket of FIG. 3.

Referring to the drawings and particularly FIGS. 1A and 1B, there is shown a fastener attaching apparatus 10 for attaching two different types of mating fastener articles or elements such as a socket 11 (see FIG. 3) and a ring 12 to each other with a material 14 therebetween. The socket 11 has an annular recess 15 (see FIG. 4) to receive prongs 16 (see FIG. 3) extending from the ring 12 when the socket 11 and the ring 12 are attached to each other.

Figure 2:
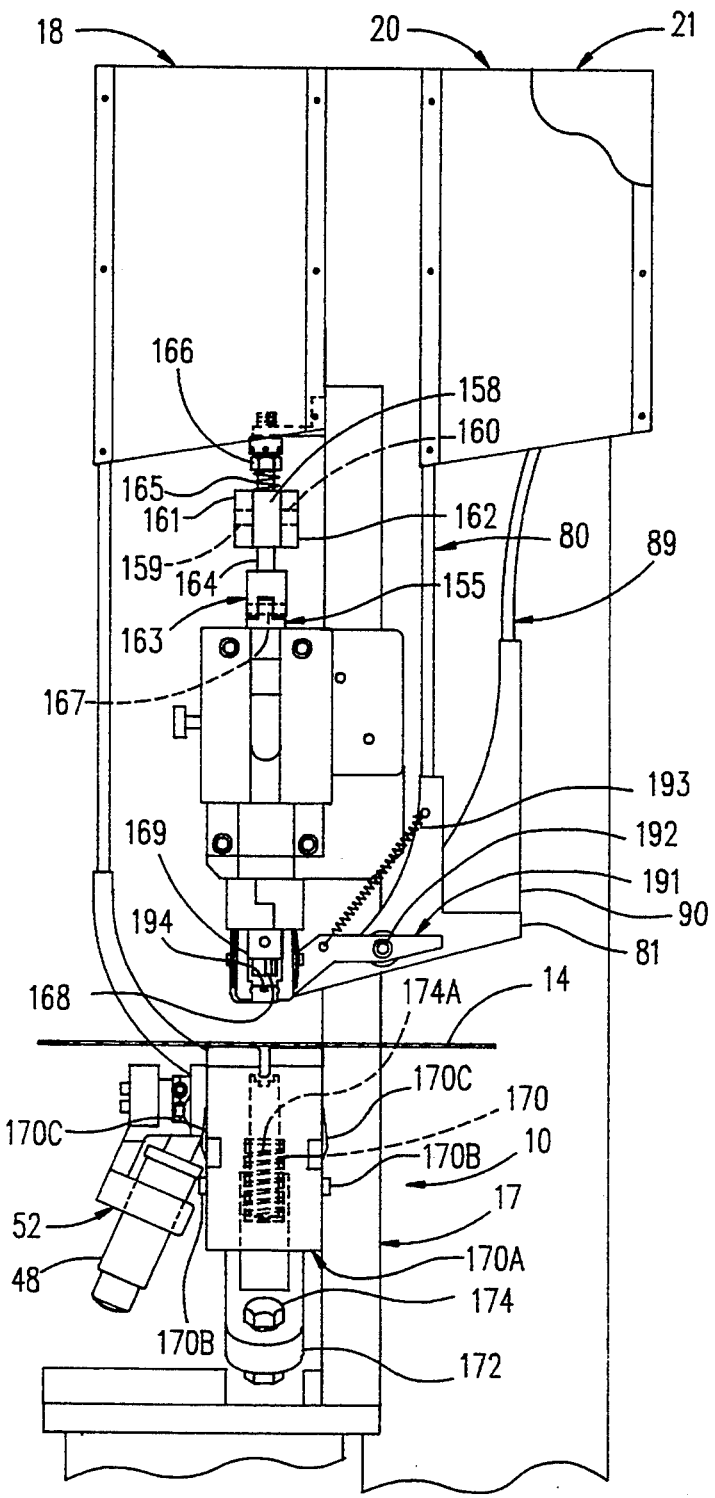
FIG. 2 is a fragmentary front end elevational view of the fastener attaching apparatus of FIGS. 1A and 1B.

The fastener attaching apparatus 10 (see FIG. 1B) includes a plate-like support 17 having hoppers 18, 19 (see FIG. 1A), 20 (see FIG. 2), and 21 mounted at its upper end. The hopper 18 (see FIG. 1B) has the rings 12 (see FIG. 3) therein, and the hopper 20 (see FIG. 2) has the sockets 11 (see FIG. 3) therein. The hopper 19 (see FIG. 1A) has rings 22 (see FIG. 9), which are different from the rings 12 (see FIG. 3) such as being painted or having a different configuration, for example, therein, and complementary to ring attached studs (RAS) 23 (see FIG. 12) within the hopper 21 (see FIG. 2).

Figure 5:
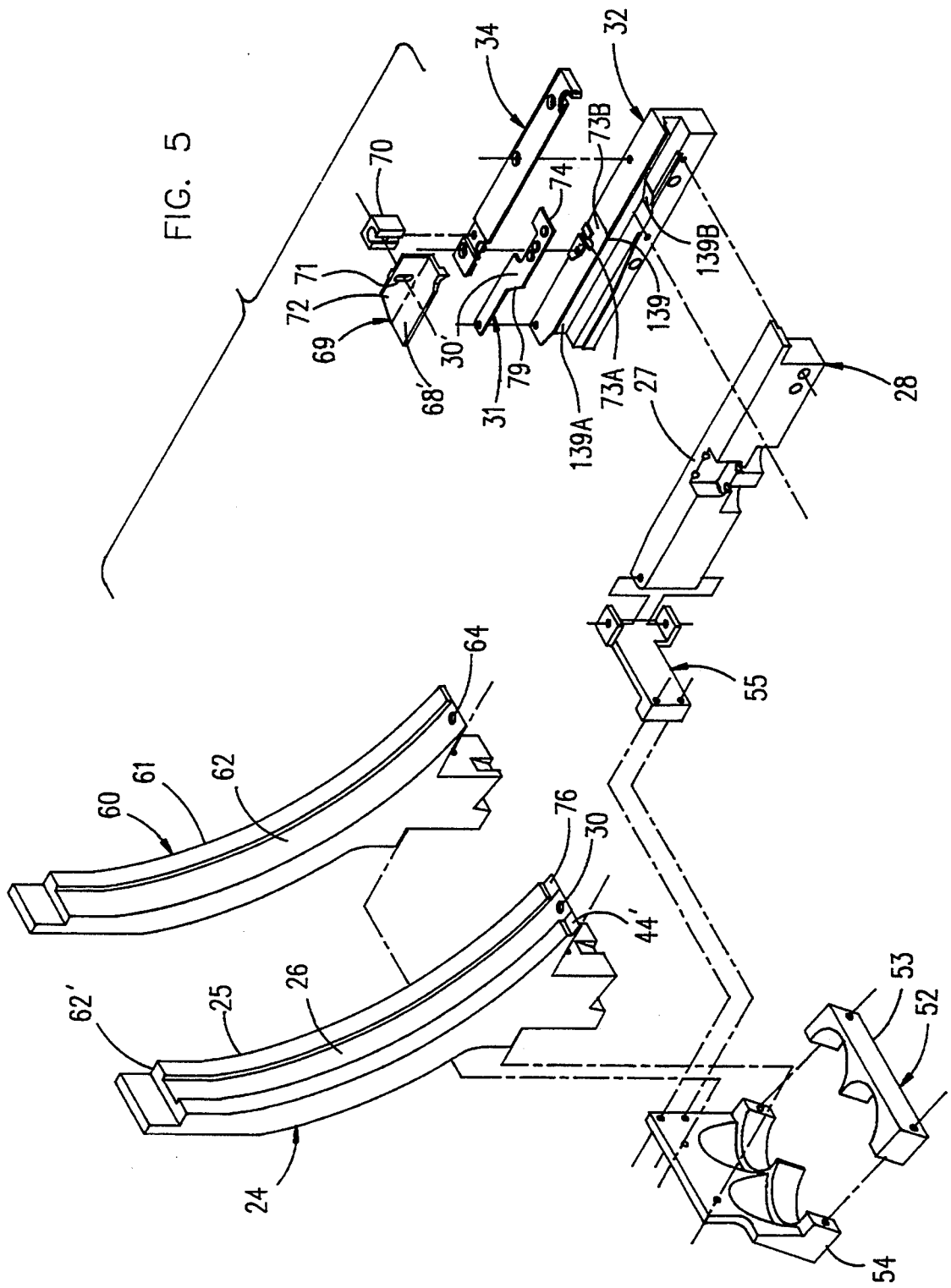
FIG. 5 is an exploded perspective view of a portion of the fastener attaching apparatus of FIGS. 1A and 1B and showing the relation of lower curved rail mounts of the feed chutes for two different types of one of the articles and the structure within which the articles are received.

In a manner similar to that shown and described in U.S. Pat. No. 4,985,987 to Schmidt et al, which is incorporated by reference, a feed chute 24 (see FIG. 1B) communicates with the hopper 18 to transport each of the rings 12 (see FIG. 3) therefrom. The feed chute 24 (see FIG. 5) has a curved lower rail mount 25 having a passage 26 therein along which the rings 12 (see FIG. 3) are transported by gravity from the hopper 18 (see FIG. 1B).

The bottom end of the passage 26 (see FIG. 5) rests on of a top flat surface 27 of a lower front rail 28. This allows one of the rings 12 (see FIG. 3) to flow from the passage 26 (see FIG. 5) when a stop or blocking pin 29 (see FIG. 6) is not extending into the passage 26 and through the ring 12 (see FIG. 3) after the stop pin 29 (see FIG. 6) passes through an opening 30 in the bottom surface of the passage 26 in the curved lower rail mount 25 of the feed chute 24. The stop pin 29 and the opening 30 are at an angle of 18° to the vertical.

The ring 12 (see FIG. 9) moves from the passage 26 to rest primarily on a top flat surface 30' of a diverter 31 with a portion of the ring 12 resting on the bottom of the passage 26. The diverter 31 is pivotally mounted on a lower rear rail 32 by a pivot pin 32'. The lower rear rail 32 is secured to the lower front rail 28.

The ring 12 is held between a flat vertical surface 33 of a cover 34, which is fixed to the lower rear rail 32 and disposed above a portion of the lower rear rail 32, and the adjacent of the rings 12 within the passage 26. The ring 12 also is positioned between two studs 34' and 35 extending upwardly from the top flat surface 30' of the diverter 31 to limit any shifting of the ring 12 in either direction substantially perpendicular to the passage 26. It should be understood that the rings 12 randomly overlap each other.

Figure 7:
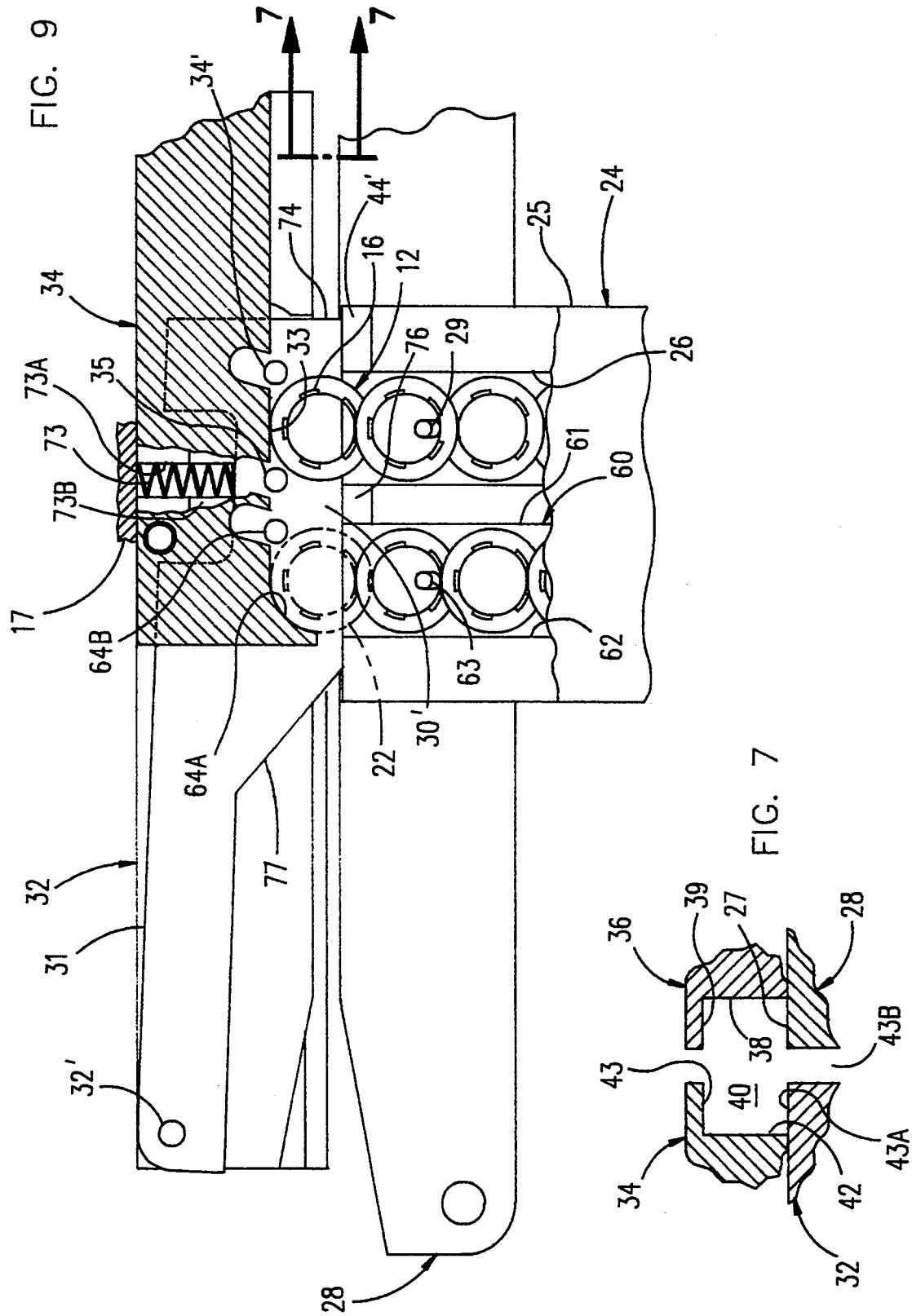
FIG. 7 is a fragmentary sectional view of a portion of the fastener attaching apparatus of FIGS. 1A and 1B and taken along line 7—7 of FIG. 9.

A cover 36 (see FIG. 8) is pivotally mounted on the lower front rail 28 by a pivot pin 37. The cover 36 has its substantially perpendicular surfaces 38 (see FIG. 7) and 39 cooperating with the top flat surface 27 of the lower front rail 28 to form a portion of a channel or passage 40. The ring 12 (see FIG. 3) rides within the channel or passage 40 (see FIG. 7) when it is advanced past the diverter 31 (see FIG. 9) by a feed-in finger 41 (see FIG. 13).

The cover 34 (see FIG. 7) has substantially perpendicular surfaces 42 and 43 with the surface 42 being parallel to the surface 38 of the cover 36 and the surface 43 being aligned with the surface 39 so that the remainder of the channel or passage 40 is formed by a top flat surface 43A of the lower rear rail 32 and the surfaces 42 and 43 of the cover 40. It should be understood that there is a slight space 43B between the lower front rail 28 and the lower rear rail 32 to enable a ring engaging portion 44 (see FIG. 13) of the feed-in finger 41 to pass therebetween. When the ring 12 is advanced by the ring engaging portion 44 of the feed-in finger 41, the ring 12 rides along a first substantially horizontal surface 44'

(see FIG. 9), which is in the same horizontal plane as the surface 30' of the diverter 31, of the curved lower rail mount 25 of the feed chute 24 and the surface 30' of the diverter 31.

The stop pin 29 (see FIG. 6) is mounted in a cut-out portion 45 of a cylinder 46, which is mounted on the upper end of a plunger 47 of a solenoid 48. The bottom end of the solenoid plunger 47 has a cap 49, which has an upside down hat configuration, press fitted thereon and disposed within the upper end of a coil spring 50. The coil spring 50 has its bottom end disposed within a cover cap 51, which is threaded into a threaded bottom end of the solenoid 48.

Thus, the position of the cover cap 51 is adjustably mounted on the solenoid 48 to adjust the force of the coil spring 50. This adjustment of the position of the cover cap 51 controls the maximum extension of the stop pin 29 by the spring 50 through the opening 30 in the passage 26 of the curved lower rail mount 25 of the feed chute 24 when the solenoid 48 is not energized.

The stop pin 29, which is disposed in the lowermost of the rings 12 (see FIG. 9) completely within the passage 26 in the curved lower rail mount 25 of the feed chute 24, is withdrawn from its ring stopping position when the solenoid 48 (see FIG. 6) is energized. When the solenoid 48 is not energized, the spring 50 continuously urges the stop pin 29 to the position in which it retains the ring 12 (see FIG. 9) within the passage 26 in the curved lower rail mount 25 of the feed chute 24.

The solenoid 48 (see FIG. 6) is supported within a solenoid support housing 52 (see FIG. 5) formed of two portions 53 and 54 attached to each other by screws. The portion 54 of the solenoid support housing 52 has the curved lower rail mount 25 of the feed chute 24 attached thereto by a screw.

The portion 54 of the solenoid support housing 52 is fixed to a hinge mount 55 by screws. The hinge mount 55 is pivotally mounted on the lower front rail 28 (see FIG. 8) by a pivot pin 56.

In a manner similar to that shown and described in the aforesaid Schmidt et al patent, a feed chute 60 (see FIG. 1B) communicates with the hopper 19 to transport each of the rings 22 (see FIG. 9) therefrom. The feed chute 60 (see FIG. 5) has a curved lower rail mount 61, which has a passage 62 formed by cooperation of the curved lower rail mount 61 with an adjacent end surface 62' of the curved lower rail mount 25. The passage 62 has the rings 22 (see FIG. 9) transported therealong by gravity from the hopper 19 (see FIG. 1A).

The bottom end of the passage 62 (see FIG. 9) is disposed so that it allows one of the rings 22 to move by gravity from the passage 62 to the top flat surface 30' of the diverter 31 when a stop or blocking pin 63 is not extending through the ring 22 after the stop or blocking pin 63 passes through an opening 64 (see FIG. 6) in the bottom of the passage 62 in the curved lower rail mount 61 of the feed chute 60. The stop pin 63 and the opening 64 are at an angle of 18° to the vertical. The ring 22 (see FIG. 9) rests primarily on the top flat surface 30' of the diverter 31 of the lower rear rail 32 with a portion of the ring 32 resting on the bottom of the passage 62.

The ring 22 is held between a curved surface 64A of the cover 34 and the adjacent of the rings 22 within the passage 62. The ring 22 is spaced slightly from a stud 64B extending upwardly from the top flat surface 30' of the diverter 31 to limit shifting of the ring 22 in a direction substantially perpendicular to the passage 62. It should be understood that the rings 22 randomly overlap each other.

The stop pin 63 (see FIG. 6) is supported in the same manner as the stop pin 29. A solenoid 65 retracts the stop pin 63 from the opening 64 in the passage 62 when the solenoid 65 is energized.

The curved lower rail mount 61 of the feed chute 60 is attached to the portion 54 (see FIG. 5) of the solenoid housing 52 by a screw. Thus, as shown in FIG. 8, the curved lower rail mounts 25 and 61 are held against each other and mounted for pivotal movement with the hinge mount 55.

Figure 8:
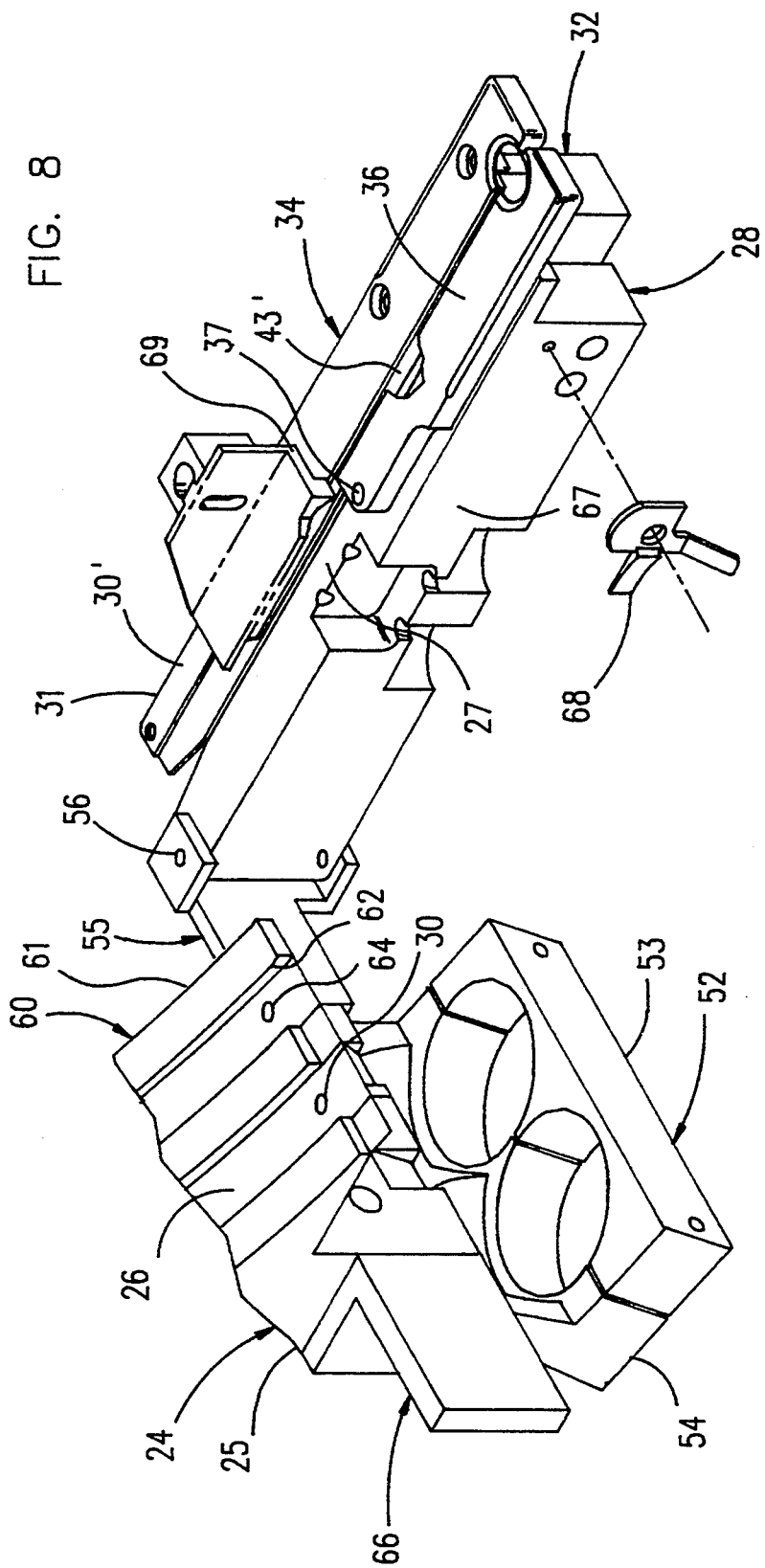
FIG. 8 is a perspective view showing the pivotal mounting arrangement of the lower curved rail mounts of FIG. 5 with respect to the structure to which the lower curved rails feed the articles.

The hinge mount 55 must be rotated 90° counterclockwise about the pivot pin 56 from its position in FIG. 8 so that the passages 26 and 62 in the curved lower rail mounts 25 and 61, respectively, communicate with the top flat surface 30' of the diverter 31. The hinge mount 55 is retained in this position through a clamp 66, which is supported by the curved lower rail mount 25, being held against a vertical surface 67 of the lower front rail 28 by a retainer 68, which is pivotally mounted on the vertical surface 67 of the lower front rail 28.

To prevent upward movement of the ring 12 (see FIG. 9) or the ring 22, a substantially horizontal portion 68' (see FIG. 5) of an L-shaped guide 69 overlies the substantially horizontal portions of the passages 26 (see FIG. 9) and 62 of the curved lower rail mounts 25 and 61, respectively, and the portions of the top flat surface 30' of the diverter 31 on which the rings 12 and 22 rest. The guide 69 (see FIG. 5) is adjustably positioned on a block 70, which is fixed to the cover 34, through an elongated vertical slot 71 in a substantially vertical portion 72 of the guide 69 receiving a screw for disposition in a threaded hole in the block 70.

The diverter 31 (see FIG. 9) is biased clockwise about the pivot pin 32' by a spring 73, which is disposed within a slot 73A in a top flat surface 73B of the lower rear rail 32. The spring 73 has one end bearing against the plate-like support 17 and its other end acting on the diverter 31. Thus, an end surface 74 of the diverter 31 is continuously urged by the spring 73 to overlie the space 43B (see FIG. 7) between the lower front rail 28 and the lower rear rail 32 through which the ring engaging portion 44 (see FIG. 13) of the feed-in finger 41 extends during advancement.

When there is retraction of the feed-in finger 41, an inclined surface 75 of the portion 44 of the feed-in finger 41 engages the end surface 74 (see FIG. 5) of the diverter 31 to move the ring engaging portion 44 (see FIG. 13) of the feed-in finger 41 downwardly beneath the horizontal plane of the top flat surface 30' (see FIG. 5) of the diverter 31, the substantially horizontal bottom portions of the passages 26 and 62, the first substantially horizontal surface 44' of the curved rail mount 25, and a second substantially horizontal surface 76 of the curved lower rail mount 25. This prevents the ring engaging portion 44 (see FIG. 13) of the feed-in finger 41 from engaging the ring 12 or 22 during retraction of the feed-in finger 41.

When the feed-in finger 41 is advanced, an inclined surface 77 (see FIG. 9) of the diverter 31 is engaged by the ring engaging portion 44 (see FIG. 13) of the feed-in finger 41 to move the diverter 31 (see FIG. 9) out of its path so that the feed-in finger 41 (see FIG. 13) can advance the ring 12 (see FIG. 9) or 22 to the single attaching or setting station. Thus, retraction of the feed-in finger 41 (see FIG. 13) is along a different path than that along which the feed-in finger 41 is advanced. This allows the ring 12 (see FIG. 9) or 22 to be supplied to its position on the substantially horizontal portion of the passage 26 or 62 and the top flat surface 30' of the diverter 31 during retraction of the feed-in finger 41 (see FIG. 13) without engagement therewith.

In a manner similar to that shown and described in the aforesaid Schmidt et al patent, a feed chute 80 (see FIG. 2) communicates with the hopper 20 to transport each of the sockets 11 (see FIG. 3) therefrom. The feed chute 80 (see FIG. 10) includes a curved lower rail mount 81 having a passage 82 therein along which the sockets 11 (see FIG. 3) are transported by gravity from the hopper 20 (see FIG. 2).

The bottom end of the passage 82 (see FIG. 10) is disposed so that one of the sockets 11 (see FIG. 3) flows from the passage 82 (see FIG. 10) to a top flat surface 83, which is substantially horizontal, of the curved lower rail mount 81 at the bottom end of the passage 82 and a top flat surface 84 (see FIG. 12), which is substantially horizontal, of a guide 85. A hardware or article positioner 86, which is supported within a recess 87 in the guide 85, has a curved recess 88 to receive a portion of the socket 11 resting on the top flat surface 84 of the guide 85.

In a manner similar to that described in the aforesaid Schmidt et al patent, a feed chute 89 communicates with the hopper 21 (see FIG. 2) to transport each of the RAS 23 (see FIG. 12) therefrom. The feed chute 89 has a curved lower rail mount 90 having a passage 91 therein along which the RAS 23 are transported by gravity from the hopper 21 (see FIG. 2).

The bottom end of the passage 91 (see FIG. 10) is disposed so that one of the RAS 23 (see FIG. 12) flows from the passage 91 to a top flat surface 92 of the curved lower rail mount 90 at the bottom end of the passage 91 and the top flat surface 84 of the guide 85. The hardware positioner 86 has a curved surface 93 at one end to receive a portion of the RAS 23 with the guide 85 having a curved recess 94 to receive another portion of the RAS 23.

The flow of the sockets 11 from the passage 82 in the curved lower rail mount 81 occurs only when a stop or blocking pin 95 is not blocking the passage 82. The stop pin 95 passes through an elongated slot 96 at the bottom of the passage 82 in the curved lower rail mount 81 of the feed chute 80.

Figure 10:
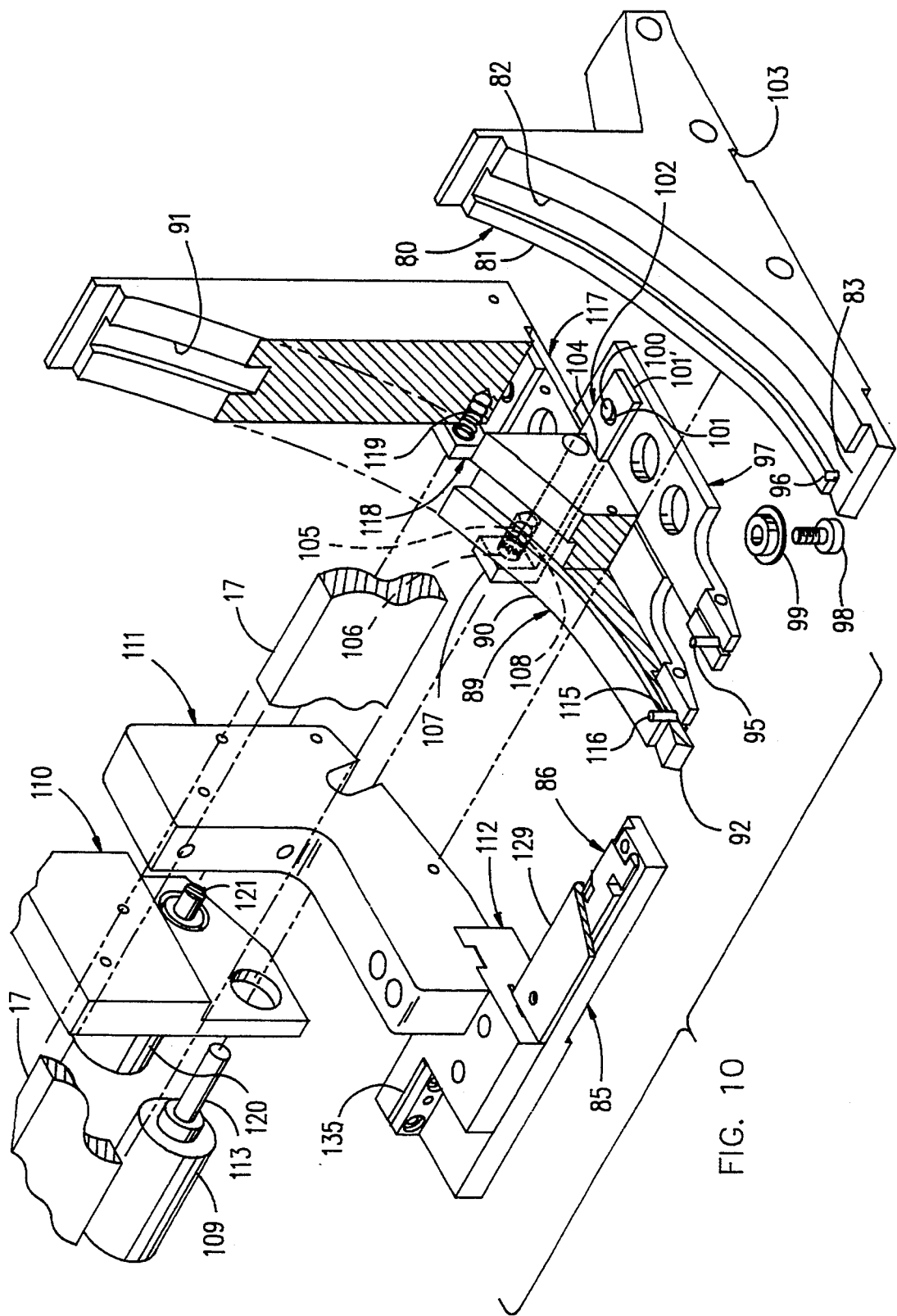
FIG. 10 is an exploded perspective view, partly in section, of a portion of the fastener attaching apparatus of FIGS. 1A and 1B and showing the relation of curved lower rail mounts of the feed chutes for two different types of the other of the articles and the structure within which the articles are received.
Figure 11:
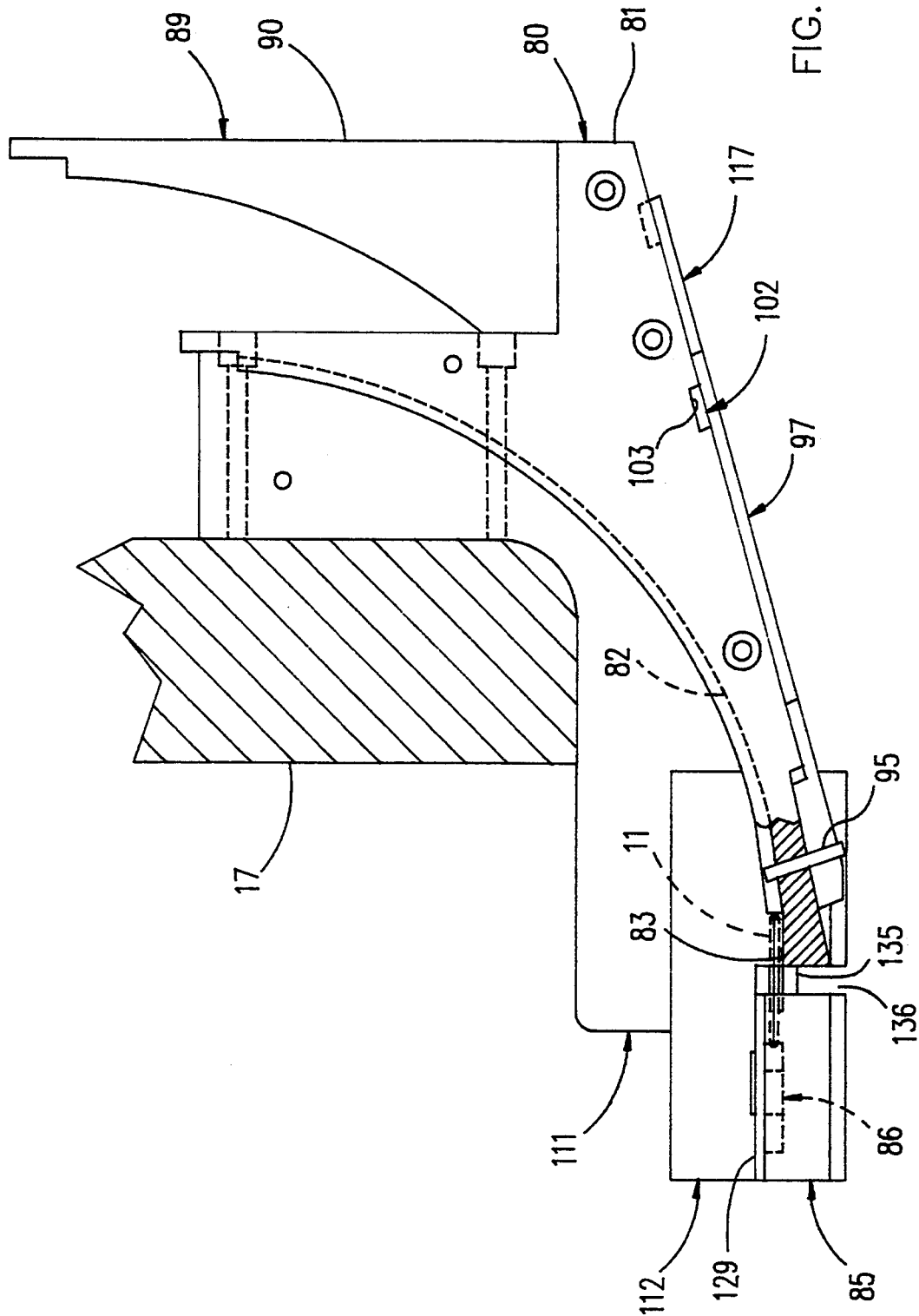
FIG. 11 is an end elevational view, partly in section, of a portion of the structure of FIG. 10 with a hardware support omitted for clarity purposes.

As shown in FIG. 10, the stop pin 95 is supported on one end of a plate 97. The plate 97 is pivotally supported on a screw 98, which attaches the plate 97 to the bottom of the curved lower rail mount 81. A bushing 99 pivotally supports the plate 97 on the screw 98.

The plate 97 has an upwardly extending pin 100 adjacent its end opposite to the stop pin 95 with the pin 100 extending into an enlarged opening 101 in a horizontal portion 101' of an L-shaped slide 102. The horizontal portion 101' of the slide 102 extends through a slot 103 in the bottom of the curved lower rail mount 81 and an aligned slot 104 in the curved lower rail mount 90.

A spring 105 has one end disposed in a recess 106 in a vertical portion 107 of the L-shaped slide 102 and its other end disposed in a recess 108 in the curved lower rail mount 90. The spring 105 continuously urges the plate 97 to pivot counterclockwise (as viewed in FIG. 10) about the screw 98 so that the stop pin 95 blocks the passage 82 to prevent flow of the lowermost socket 11 (see FIG. 12) from the passage 82.

The stop pin 95 (see FIG. 10) is moved out of its blocking position when a solenoid 109 is energized. The solenoid 109 is supported by a solenoid mount 110, which is secured to a limiter block mount 111 supported by the plate-like support 17.

The limiter block mount 111 has a limiter block 112 supported on its bottom. The limiter block 112 has the guide 85 supported on its bottom.

The solenoid 109 has its plunger 113 engaging the vertical portion 107 of the L-shaped slide 102. Thus, when the plunger 113 extends from the solenoid 109, the force of the spring 105 is overcome, and the L-shaped slide 102 is moved towards the end wall of the curved lower rail mount 90 to pivot the blocking pin 95 out of its blocking position so that the lowermost of the sockets 11 (see FIG. 12) can move from the passage 82 in the lower curved rail mount 81 of the feed chute 80 to the position shown in FIG. 12.

The passage 91 in the curved lower rail mount 90 has an elongated slot 115 to receive a blocking pin 116, which is supported on one end of a pivotally mounted plate 117 (see FIG. 10) in the same manner as the blocking pin 95 is supported on the pivotally mounted plate 97. The plate 117 has an L-shaped slide 118 connected thereto in the same manner as the L-shaped slide 102 is connected to the plate 97. A spring 119 biases the slide 118 in the same manner as the spring 105 biases the slide 102 so that the blocking pin 116 is urged to its blocking position.

A solenoid 120 is supported by the solenoid mount 110. When the solenoid 120 is energized, its plunger 121 acts on the L-shaped slide 118 to pivot the plate 117 so that the blocking pin 116 no longer blocks the passage 91 in the curved lower rail mount 90.

When the socket 11 (see FIG. 12) is released from the passage 82 in the curved lower rail mount 81, the selected socket 11 is held between a stop 122, the wall of the curved recess 88 in the hardware positioner 86, and the next of the sockets 11 within the passage 82 in the curved lower rail mount 81 of the feed chute 80. The stop 122 extends upwardly from the guide 85 and is disposed within a slot 123 in the hardware positioner 86.

Springs 124 and 125 continuously urge the wall of the curved recess 88 into engagement with the selected socket 11. The movement of the hardware positioner 86 by the springs 124 and 125 is stopped by shoulders 125A and 125B on the guide 85 engaging surfaces 125C and 125D, respectively, on the hardware positioner 86.

The spring 124 is disposed in a slot 126 in the hardware positioner 86 and a blind hole 127 in the guide 85. The spring 125 is disposed in a slot 128 in the hardware positioner 86 and a blind hole 128' in the guide 85.

A cover 129 (see FIG. 10) overlies the hardware positioner 86 to prevent upward movement of the selected socket 11 (see FIG. 12) or the selected RAS 23. The cover 129 (see FIG. 10) is fixed to the guide 85 by screws.

When the RAS 23 (see FIG. 12) is released from the passage 91 in the curved lower rail mount 90 by withdrawing the blocking pin 116, the selected RAS 23 is held between the curved surface 93 of the hardware positioner 86, the wall of the recess 94 in the guide 85, and the next of the RAS 23 within the passage 91 in the curved lower rail mount 90 of the feed chute 89. Therefore, the selected socket 11 or the selected RAS 23 is positioned for advancement to the single attaching or setting station by a feed-in finger 130 (see FIG. 13).

The socket 11 or the RAS 23 is advanced to the single attaching or setting station by an end surface 131 of the feed-in finger 130 engaging the socket 11 or the RAS 23 during advancement of the feed-in finger 130. If the socket 11 is disposed for engagement by the end surface 131 of the feed-in finger 130, advancement of the socket 11 will cause the spring 124 (see FIG. 12) to be compressed so that the hardware positioner 86 pivots clockwise slightly. This results in the socket 11 no longer being disposed within the recess 88 in the hardware positioner 86 but riding along an end surface 132 of the hardware positioner 86. The stop 122 does not have a tight fit within the slot 123 in the hardware positioner 86 so that the slight pivoting of the hardware positioner 86 can occur.

If the RAS 23 is disposed for engagement by the end surface 131 (see FIG. 13) of the feed-in finger 130, advancement of the RAS 23 will initially cause the spring 125 (see FIG. 12) to be compressed so that the hardware positioner 86 pivots counterclockwise slightly. As the RAS 23 is advanced out of the curved surface 93 of the hardware positioner 86 and along the end surface 132 of the hardware positioner 86, the spring 125 ceases to be fully compressed and the spring 124 also is compressed. As the RAS 23 is advanced into the curved recess 88 in the hardware positioner 86, the spring 125 ceases to be compressed. Continued advancement of the RAS 23 causes additional compression of the spring 124 so that the hardware positioner 86 pivots clockwise slightly to allow the RAS 23 to move out of the recess 88 in the hardware positioner 86 and onto the end surface 132 of the hardware positioner 86.

During retraction of the feed-in finger 130 (see FIG. 13), an inclined surface 133 of the feed-in finger 130 engages the RAS 23 if the RAS 23 has been advanced from the passage 91 (see FIG. 12) as the selected article after retraction of the feed-in finger 130 (see FIG. 13) has started. A cycle of operation begins with simultaneous retraction of the feed-in fingers 41 and 130.

Engagement of the inclined surface 133 of the feed-in finger 130 with the RAS 23 causes the feed-in finger 130 to be moved downwardly to the phantom line position of FIG. 13. After the feed-in finger 130 has been moved downwardly, as shown in phantom in FIG. 13, the retraction of the feed-in finger 130 continues to the solid line position of FIG. 14. A spring 134 urges the feed-in finger 130 to the solid line position of FIG. 14.

If the socket 11 (see FIG. 12) has been advanced from the passage 82 as the selected article after retraction of the feed-in finger 130 (see FIG. 13) has started, the inclined surface 133 of the feed-in finger 130 may or may not engage the socket 11 during its retraction. This depends on when the blocking pin 95 (see FIG. 12) is withdrawn.

The feed-in finger 130 (see FIG. 13) may be at the location of the passage 82 (see FIG. 12) when the blocking pin 95 is withdrawn from its blocking position. If this occurs, the path of the feed-in finger 130 (see FIG. 13) is not changed because the socket 11 does not engage the inclined surface 133.

Figure 12:
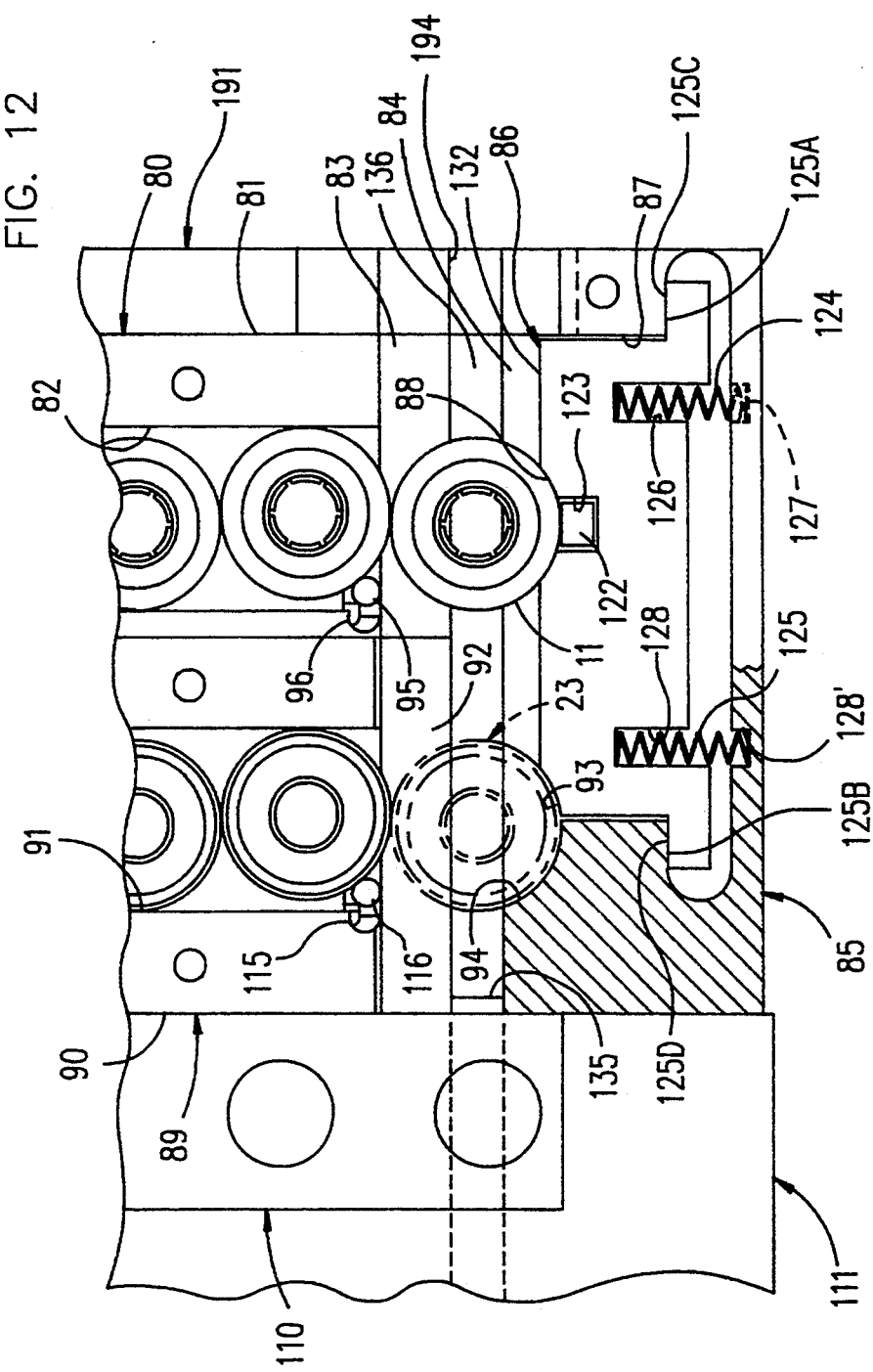
FIG. 12 is a fragmentary top plan view, partly in section, of a portion of the fastener attaching apparatus of FIGS. 1A and 1B showing the relation of the feed chutes to where one of the second articles is received and shown in solid with the other second article being shown in phantom and with a top cover omitted for clarity purposes.

However, if the socket 11 is in its position of FIG. 12 prior to the inclined surface 133 (see FIG. 13) having passed the position of the socket 11 in FIG. 12, then the inclined surface 133 (see FIG. 13) of the feed-in finger 130 will engage the socket 11 and the feed-in finger 130 will move downwardly to pass beneath the socket 11. Therefore, there can be one or two alternate paths of retraction for the feed-in finger 130 depending on when the blocking pin 95 (see FIG. 12) ceases to block the passage 82.

A limiter 135 (see FIG. 13) is adjustably mounted on the limiter block 112 (see FIG. 10) for horizontal movement through the limiter 135 having a horizontal elongated slot 135' (see FIG. 13) therein. The limiter 135 limits the upward movement of the feed-in finger 130 by the spring 134 at all times.

Maximum retraction of the feed-in finger 130 is shown in phantom in FIG. 14. At this time, the end surface 131 of the feed-in finger 130 is positioned to engage the socket 11 (see FIG. 12) or the RAS 23 depending on which is selected during retraction of the feed-in finger 130 (see FIG. 14). The advancement of the feed-in finger 130 from its maximum retracted position (the phantom line position of FIG. 14) is shown initially in the solid line position of FIG. 15 and then the solid line position of FIG. 13.

During both its retraction and advancement, the feed-in finger 130 rides in a space 136 (see FIG. 12). The space 136 is formed between the side of the top flat surface 84 of the guide 85 and the sides of the top flat surfaces 83 and 92 of the curved lower rail mounts 81 and 90, respectively.

It should be understood that a spring 137 (see FIG. 1B) continuously urges the feed-in finger 41 upwardly so that a roller 138 (see FIG. 13) on the feed-in finger 41 rides along a top surface 139 (see FIG. 5) of a passage 139A in the lower rear rail 32. An inclined bottom wall 139B in the passage 139A accommodates the feed-in finger 41 (see FIG. 13) when it is moved downwardly during retraction by the inclined surface 75 of the feed-in finger 41 engaging the end surface 74 (see FIG. 5) of the diverter 31.

The feed-in finger 41 (see FIG. 13) is pivotally mounted on a feed arm 140 (see FIG. 1B) by a screw 141. The spring 137 has one end attached to the feed arm 140 and its other end connected to the feed-in finger 41 through a link 141'. The feed arm 140 has the feed-in finger 130 pivotally mounted thereon by a screw 142.

The feed arm 140 is pivotally connected through a screw 143 to a rod end bearing 144, which is connected to a swivel block 145. The swivel block 145 has a cylindrical portion (not shown) rotatably supported within a circular opening (not shown) in a downwardly extending portion 147 of an upper power arm 148.

The upper power arm 148 is pivotally mounted on a shoulder shaft (not shown) supported by the plate-like support 17. A cap 149, which is secured to the end of the shoulder shaft by a screw 149' extending into a threaded hole in the end of the shoulder shaft, retains the upper power arm 148 on the shoulder shaft.

The upper power arm 148 is connected through an adjustable linkage 150 (see FIG. 1A), which is a push rod assembly, to a cam 151 by the adjustable linkage 150 having a shaft 151A threaded into a threaded hole in a base 151B, which is attached to the cam 151 by a stud 151C extending through the base 151B and having its threaded end threaded into a threaded hole in the cam 151. The cam 151 is fixed to one end of a shaft 152 (see FIG. 16), which makes one revolution during each cycle of operation of the fastener attaching apparatus 10 (see FIG. 1A).

As shown and described in our copending application, Ser. No. 08/084,024, filed Jun. 30, 1993, incorporated by reference herein, the shaft 152 (see FIG. 16) is rotated when a one revolution solenoid clutch, for example, is activated to produce a cycle of operation of the fastener attaching apparatus 10 (see FIG. 1A). This activation connects the shaft 152 (see FIG. 10) to a flywheel, which is continuously rotated by a continuously rotating electric motor through pulleys and a belt.

The upper power arm 148 (see FIG. 1B) also is connected to a ram 155, which is slidably disposed within a housing 156 supported by the support 17 and having a cover 157 attached thereto, to cause axial motion of the ram 155 in both directions in the manner shown and described in our aforesaid application. This connection includes a pivot block 158 having pivot pins 159 and 160 (see FIG. 2) extending from opposite sides thereof for disposition in openings in two brackets 161 and 162 on the upper power arm 148 (see FIG. 1B) to pivotally support the pivot block 158 on the upper power arm 148.

The pivot block 158 (see FIG. 2) supports a clevis 163 through the clevis 163 having a threaded rod 164 on its upper end extending through a passage (not shown) in the pivot block 158. An overtravel spring 165 surrounds the threaded rod 164 between a cap nut 166 on the end of the threaded rod 164 and the pivot block 158. Thus, the clevis 163 is resiliently connected to the pivot block 158. The clevis 163 is connected to the ram 155 through the ram 155 having its reduced upper end connected by a shaft 167 (see FIG. 1B) to the clevis 163.

Through a die 168 (see FIG. 2) on a plunger 169 connected to the ram 155, downward movement of the ram 155 causes the socket 11 (see FIG. 13) or the RAS 23, depending on which is selected, to move downwardly when the socket 11 or the RAS 23 is at the single attaching or setting station. At the same time that the ram 155 (see FIG. 2) is moved downwardly, a holder 170 is moved upwardly to move the selected ring 12 (see FIG. 13) or 22, depending on which is selected, upwardly. Thus, the selected socket 11 and the selected ring 12 or the selected RAS 23 and the selected ring 22 are moved into engagement with each other with the material 14 (see FIG. 2) therebetween at the single attaching or setting station.

The ring 12 (see FIG. 13) or 22 is held in position by a pair of jaws, which are pivotally mounted on an anvil block 170A (see FIG. 2) as shown and described in our aforesaid application. The anvil block 170A is supported on the support 17. Springs 170C, which are mounted on the anvil block 170A by screws 170B, continuously urge the jaws towards each other. Prior to downward movement of the die 168 to exert a force on the socket 11 (see FIG. 13) or the RAS 23 to connect the socket 11 to the ring 12 or to connect the RAS 23 to the ring 22, the ring 12 or 22 is moved upwardly out of gripping engagement by the jaws through upward movement of the holder 170.

The holder 170 is moved upwardly through a cam follower 171 (see FIG. 1A) on a lower power arm 172, which is pivotally mounted on a shoulder shaft 173 (see FIG. 1B) supported by the plate-like support 17, remaining in continuous engagement with the cam 151 (see FIG. 1A). The movement of the lower power arm 172 is controlled by the contour of the cam 151 during rotation of the cam 151. The lower power arm 172 moves the holder 170 (see FIG. 1B) upwardly through having an adjustable screw 174 on its end for engaging the bottom of the holder 170.

A spring 174A (see FIG. 2) surrounds the holder 170 and continuously urges it into engagement with the extending screw 174 on the lower power arm 172 at its remote end from the cam follower 171 (see FIG. 1A). The screw 174 (see FIG. 2) lifts the holder 170 during pivotal motion of the lower power arm 172 in each cycle of operation of the fastener attaching apparatus 10. As previously mentioned, pivotal motion of the lower power arm 172 is due to the cam follower 171 (see FIG. 1A) engaging the contour of the cam 151. As the holder 170 (see FIG. 2) is moved upwardly against the force of the spring 174A, a top surface of the holder 170 receives the ring 12 (see FIG. 13) or 22 and the jaws, which are pivotally mounted on the anvil block 170A (see FIG. 2), are cammed out of engagement with the ring 12 (see FIG. 13) or 22 by the upward movement of the holder 170 (see FIG. 2).

The holder 170 has its top surface formed with a recess having the configuration of the bottom annular portion of the ring 12 (see FIG. 13) or 22 with the prongs 16 (see FIG. 3) extending upwardly. Thus, the recess, which surrounds a hole in the top surface of the holder 170 (see FIG. 2), receives the bottom portion of the ring 12 (see FIG. 13) or 22 to support the ring 12 or 22 when the ring 12 or 22 is no longer gripped by the jaws, which are pivotally mounted on the anvil block 170A (see FIG. 2). As the holder 170 is moved upwardly, the prongs 16 (see FIG. 3) on the ring 12 or 22 enter the annular recess 15 (see FIG. 4) in the socket 11 after passing through the material 14 (see FIG. 2).

Considering the operation of the present invention, each depression of a foot pedal switch (not shown), for example, by an operator of the fastener attaching apparatus 10 (see FIG. 2) starts a cycle of operation in which the ram 155 is moved downwardly and the holder 170 is moved upwardly simultaneously. This causes the selected socket 11 (see FIG. 3) to be moved into engagement with the selected ring 12 or the selected RAS 23 (see FIG. 13) to be moved into engagement with the selected ring 22. This is accomplished by the shaft 152 (see FIG. 16) being rotated because of energization of the one revolution solenoid clutch (not shown).

When the one revolution solenoid clutch is energized by the operator pressing the foot pedal switch, for example, the motion of the upper power arm 148 (see FIG. 1B) not only causes downward motion of the ram 155 but also causes retraction of the feed-in fingers 41 and 130. The home position of the feed-in fingers 41 and 130 is with the feed-in fingers 41 and 130 fully advanced as shown in the solid line position of FIG. 13.

The shaft 152 (see FIG. 16) also has a cam 175 mounted thereon. A pivotally mounted switch arm 176 of a switch 177 is engaged by the cam 175 shortly after the cycle of operation begins to close the switch 177 for a short period of time. The closing of the switch 177 results in either the solenoids 48 (see FIG. 6) and 109 (see FIG. 10) being momentarily energized if the socket 11 (see FIG. 3) and the ring 12 have been selected or the solenoids 65 (see FIG. 6) and 120 (see FIG. 10) being momentarily energized if the ring 22 (see FIG. 13) and the RAS 23 have been selected.

As shown in FIG. 16, the switch 177 is connected to an integrated circuit 178, which is part of a control circuit board 179. The control circuit board 179 includes a display 180 showing the number of counts in a counter for the solenoids 48 and 109 and a display 181 showing the number of counts in a counter for the solenoids 65 and 120.

The counter, which has its count shown on the display 180, has its count increased by a count of one by each depression of a push button 182 and decreased by a count of one each time that a push button 183 is depressed. Similarly, the counter, which has its count shown on the display 181, has its count increased by a count of one each time that a push button 184 is depressed and its count decreased by a count of one by depressing a push button 185.

Whenever an operator fails to properly attach a fastener, an additional count must be added in the counter to enable the operator to correctly attach the fastener. This is accomplished by depressing a push button 186 to increase the count by one in the specific counter being accessed.

The depression of a push button 187 causes continuous operation of either the pair of the solenoids 48 and 109 or the pair of the solenoids 65 and 120. The first depression of the push button 187 selects the solenoids 48 and 109 or 65 and 120 that are presently being used. A second depression of the push button 187 selects the pair of the solenoids 48 and 109 or 65 and 120 that is not presently being used.

A restart push button 188 always selects the solenoids 48 and 109 for energization when depressed. Depression of the restart push button 188 also subtracts one from the count in the display 180 and sets the counter having the display 180 to this new count.

With the pivotally mounted switch arm 176 having been moved by the cam 175 to momentarily close the switch 177 so that a signal is momentarily sent to the integrated circuit 178, the integrated circuit 178 produces an electrical signal for momentarily energizing either the solenoids 48 and 109 or the solenoids 65 and 120. This depends on the software in which the decision is made as to whether the front hoppers 18 (see FIG. 1A) and 20 (see FIG. 1B) have been selected or not.

It should be understood that when the count in one of the counters reaches zero as shown in the corresponding display 180 (see FIG. 16) or 181, control is passed to the other counter and the display connected thereto. Then, the counter, which has been counted to zero, is again reset to the same count unless one of the push buttons 182-185 has been pushed to change the count.

If the solenoids 48 and 109 are selected, then the stop or blocking pin 29 (see FIG. 9) is withdrawn from blocking the passage 26 in the curved lower rail mount 25 of the feed chute 24 to allow one of the sockets 11 to move to the position in which the socket 11 will be engaged by the end surface 131 (see FIG. 13) of the feed-in finger 130. At the same time, energization of the solenoid 109 (see FIG. 10) shifts the position of the stop or blocking pin 95 (see FIG. 12) within the elongated slot 96 so that it no longer blocks the passage 82 in the curved lower rail mount 81 of the feed chute 80. Thus, one of the sockets 11 moves to the position in FIG. 12 in which the socket 11 engages the wall of the recess 88 in the article positioner 86.

Figure 6:
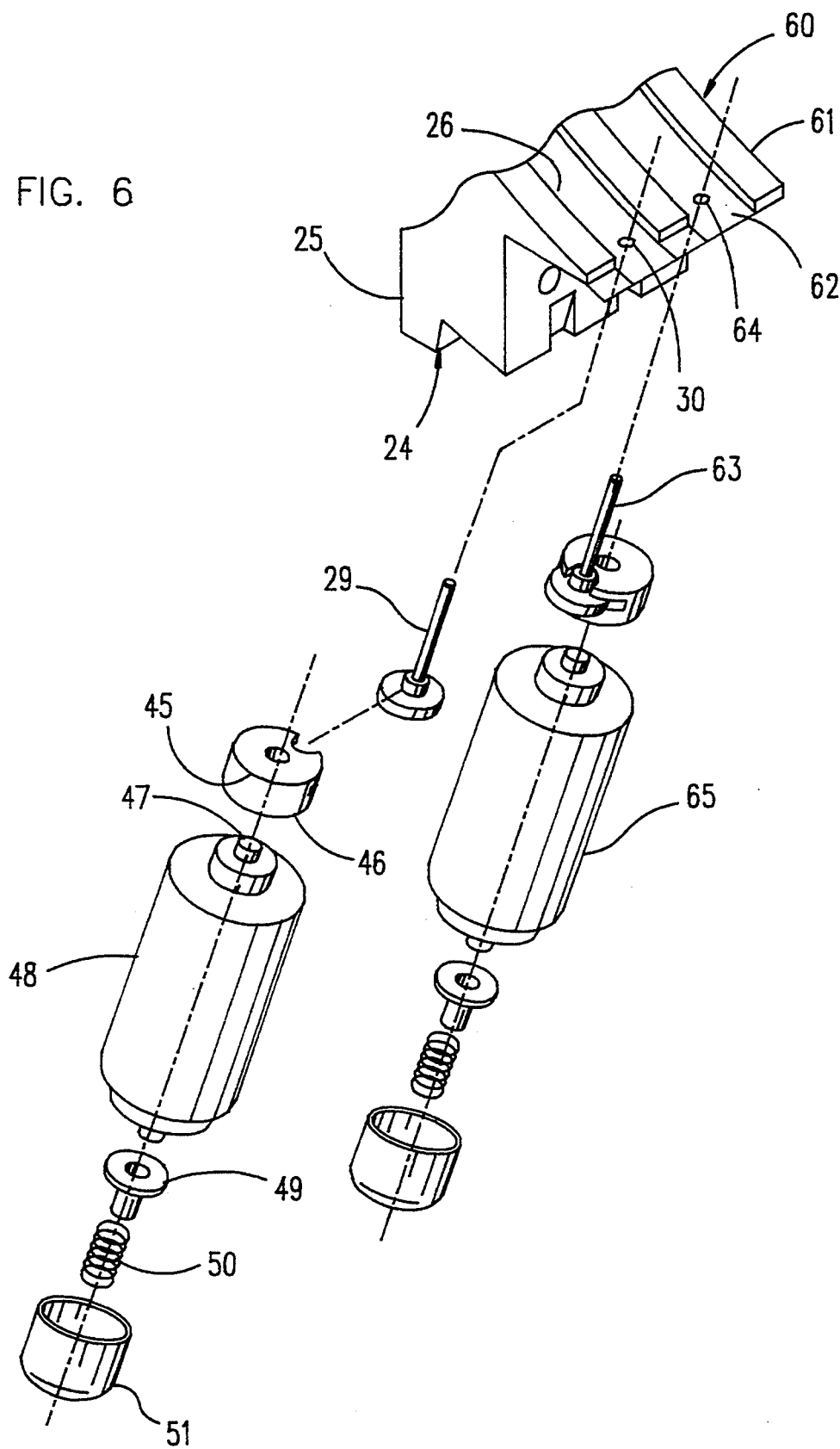
FIG. 6 is an exploded perspective view of a pair of stop or blocking pins for use with the curved lower rail mounts of FIG. 5 and the solenoids for moving the stop or blocking pins.

If the solenoid 65 (see FIG. 6) and the solenoid 120 (see FIG. 10) are selected for energization, then the stop or blocking pin 63 (see FIG. 9) is withdrawn from blocking the passage 62 in the curved lower rail mount 61 of the feed chute 60 because of energization of the solenoid 65 (see FIG. 6). This allows the ring 22 (see FIG. 9) to move to the phantom line position shown in FIG. 9 in which the ring 22 engages the curved surface 64A of the cover 34.

At the same time, the solenoid 120 (see FIG. 10) is energized to shift the position of the blocking pin 116 (see FIG. 12) within the elongated slot 115 in the curved lower rail mount 90 of the feed chute 89. This enables the lowermost of the RAS 23 within the passage 91 in the curved lower rail mount 90 of the feed chute 89 to escape therefrom. The RAS 23 engages the curved surface 93 of the article positioner 86 the wall of and the curved recess 94 in the guide 85.

It should be understood that the selected solenoids 48 (see FIG. 6) and 109 (see FIG. 10) or the selected solenoids 65 (see FIG. 6) and 120 (see FIG. 10) are activated for a very short period of time. This activation occurs during retraction of the feed-in fingers 41 (see FIG. 13) and 130. Thus, the selected articles of hardware are disposed in position during retraction of the feed-in fingers 41 and 130.

It should be understood that the rings 12 in the hopper 18 (see FIG. 1B) are loaded into the feed chute 24 through raising and lowering a pivotally mounted knife blade 189, which is driven from a motor 190 (see FIG. 1A). The motor 190 drives a knife blade in each of the hoppers 19, 20 (see FIG. 2), and 21 for the same purpose.

To enable the socket 11 (see FIG. 13) or the RAS 23 to escape if it is not properly positioned for engagement by the die 168 (see FIG. 2) during downward movement of the die 168, a hardware support 191 is pivotally mounted by a pivot bushing 192 on the curved lower rail mount 81 of the feed chute 80. The hardware support 191 is biased to its position of FIG. 2 by a spring 193 in which a notch 194 in the hardware support 191 allows the feed-in finger 130 (see FIG. 13) to pass therethrough. If the socket 11 or the RAS 23 is not properly positioned when struck by the downward motion of the die 168 (see FIG. 2), the hardware support 191 will pivot counterclockwise and allow the socket 11 (see FIG. 13) or the RAS 23 to escape.

While the movements of the upper power arm 148 (see FIG. 1B) and the lower power arm 172 have been described as being provided through an electric motor continuously driving a flywheel with a one revolution solenoid clutch connecting the flywheel to a cam, it should be understood that each of the upper power arm 148 and the lower power arm 172 may be eliminated and the feed-in fingers 41 and 130, the ram 155, and the holder 170 driven by separate air cylinders in the manner described in the aforesaid Schmidt et al patent. It also should be understood that any other suitable drive means may be used.

It should be understood that the knife blade 189 for the hopper 18 and the knife blades for the hoppers 19 (see FIG. 1A), 20 (see FIG. 2), and 21 may be driven from air cylinders in the manner more particularly shown and described in the aforesaid Schmidt et al patent or from the same electric motor as drives the upper power arm 148 (see FIG. 1A) and the lower power arm 172. The motor 190 permits more than one cycle of movement of the knife blade 189 (see FIG. 1B) and the corresponding knife blades for the hoppers 19 (see FIG. 1A), 20 (see FIG. 2), and 21 during each cycle of operation of the fastener attaching apparatus 10.

It should be understood that the solenoids 48 (see FIG. 6) and 109 (see FIG. 10) or the solenoids 65 (see FIG. 6) and 120 (see FIG. 10) may be energized at any time after the previously selected articles have been advanced by the feed-in fingers 41 (see FIG. 13) and 130 until the feed-in fingers 41 and 130 have completed their retraction. Thus, a relatively large timing window is provided in which the articles may be selected.

However, if the solenoids 48 (see FIG. 6) and 109 (see FIG. 10) or the solenoids 65 (see FIG. 6) and 120 (see FIG. 10) are energized before the feed-in fingers 41 (see FIG. 13) and 130 complete their advancement, there would be two of each of the first and second selected articles to be used at the single attaching station during each of the next two cycles of operation. If the solenoids 48 (see FIG. 6) and 109 (see FIG. 10) or the solenoids 65 (see FIG. 6) and 120 (see FIG. 10) are not energized until late in the retraction of the feed-in fingers 41 (see FIG. 13) and 130, timing becomes critical as exists with the aforesaid Herten patent, for example, since the timing window is very small. The cam 175 (see FIG. 16) determines when the solenoids 48 (see FIG. 6) and 109 (see FIG. 10) or the solenoids 65 (see FIG. 6) and 120 (see FIG. 10) are energized during each cycle of operation.

An advantage of this invention is that a much faster cycle of operation of the fastener attaching apparatus can be accomplished than in presently available fastener attaching apparatuses. Another advantage of this invention is that it eliminates the timing problems of previous fastener attaching apparatuses having fastener articles, which are complementary to each other, being selected for disposition within the same path in which a reciprocating mover is disposed.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A cyclically operated attaching apparatus for attaching complementary first and second articles of hardware to each other at a single attaching station including:
   a plurality of first sources, each of said first sources having a different type of first articles;
   a plurality of second sources, each of said second sources having a different type of second articles, each type of the second articles being complementary to a particular type of the first articles;
   first transport means for transporting each of the first articles of one type from one of said first sources;
   second transport means for transporting each of the first articles of another type from another of said first sources;
   first receiving means for receiving each of the first articles from said first transport means and for receiving each of the first articles from said second transport means;
   first article selecting means for selecting the next of the first articles from one of said first sources for supply to said first receiving means;
   third transport means for transporting each of the second articles of one type from one of said second sources;
   fourth transport means for transporting each of the second articles of another type from another of said second sources;
   second receiving means for receiving each of the second articles from said third transport means and for receiving each of the second articles from said fourth transport means;
   second article selecting means for selecting the next of the second articles from one of said second sources for supply to said second receiving means;
   said first article selecting means and said second selecting means selecting complementary types of first and second articles;
   first feed means for feeding each of the selected first articles at said first receiving means to the single attaching station by advancing each of the selected first articles from said first receiving means along a first path to the single attaching station;
   said first feed means including reciprocating means movable along the first path for engaging the selected first article at said first receiving means during advancement of said reciprocating means towards the single attaching station, said reciprocating means being retracted from the single attaching station along a second path, different from the first path, so that said reciprocating means does not engage the next selected first article at said first receiving means during its retraction;
   said first article selecting means being effective after said reciprocating means of said first feed means has advanced the selected first article from said first receiving means to enable the next selected first article to be received at said first receiving means from one of said first transport means and said second transport means;
   second feed means for feeding each of the selected second articles at said second receiving means to the single attaching station by advancing the selected second article from said second receiving means along a third path to the single attaching station;
   said second feed means including reciprocating means movable along the third path for engaging the selected second article at said second receiving means during advancement of said reciprocating means along the third path towards the single attaching station;
   said second article selecting means being effective after said reciprocating means of said second feed means has advanced the selected second article from said second receiving means to enable the next selected second article to be received at said second receiving means from one of said third transport means and said fourth transport means;
   and preventing means for preventing movement of the next selected second article by said reciprocating means of said second feed means during its retraction when said second article selecting means is effective at a time to cause the next selected second article to be engaged by said reciprocating means of said second feed means during its retraction so that said reciprocating means of said second feed means moves along a fourth path, different from the third path, during at least the portion of its retraction in which the next selected second article is engaged by said reciprocating means of said second feed means during its retraction.

2. The apparatus according to claim 1 including cooperating means for cooperating with said reciprocating means of said first feed means to move said reciprocating means of said first feed means to the second path during at least a portion of its retraction so that said reciprocating means of said first feed means cannot engage the next selected first article at said first receiving means during its retraction.

3. The apparatus according to claim 2 including causing means for causing each of said reciprocating means of said first feed means and said reciprocating means of said second feed means to advance and retract at the same time.

4. The apparatus according to claim 3 including:
first overlying means for overlying the selected first article at said first receiving means to prevent upward movement of the selected first article when engaged by said reciprocating means of said first feed means;
and second overlying means for overlying the selected second article at said second receiving means to prevent upward movement of the selected second article when engaged by said reciprocating means of said second feed means.

5. The apparatus according to claim 4 in which said cooperating means includes engaging means for engaging said reciprocating means of said first feed means during its retraction from the single attaching station to cause movement of said reciprocating means of said first feed means away from the first path at least during its movement past said first receiving means.

6. The apparatus according to claim 5 in which:
said second overlying means prevents upward movement of the next selected second article at said second receiving means when engaged by said reciprocating means of said second feed means;
said preventing means includes means for preventing movement of the next selected second article at said second receiving means in the direction of retraction of said reciprocating means of said second feed means when engaged by said reciprocating means of said second feed means during its retraction while allowing movement of the next selected second article by said reciprocating means of said second feed means in the direction of advancement of said reciprocating means of said second feed means;
and said reciprocating means of said second feed means includes a surface for cooperating with the next selected second article at said second receiving means during retraction of said reciprocating means of said second feed means to cause downward movement of said reciprocating means of said second feed means to enable said reciprocating means of said second feed means to pass beneath the next selected second article at said second receiving means during retraction of said reciprocating means of said second feed means.

7. The apparatus according to claim 6 in which:
said reciprocating means of said second feed means includes a pivotally mounted feed-in finger having an upper inclined surface as said cooperating surface;
said second feed means includes means continuously urging said pivotally mounted feed-in finger upwardly so that said upper inclined surface of said pivotally mounted feed-in finger engages the bottom of the next selected second article at said second receiving means during retraction of said pivotally mounted feed-in finger of said second feed means when the next selected second article is disposed to be engaged by said pivotally mounted feed-in finger of said second feed means during retraction of said pivotally mounted feed-in finger of said second feed means;
and limit means for limiting the upward movement of said pivotally mounted feed-in finger of said second feed means by said continuously urging means.

8. The apparatus according to claim 1 including:
a hardware positioner at said second receiving means;
support means for supporting said hardware positioner for movement relative to the direction of movement of said reciprocating means of said second feed means;
means for continuously urging said hardware positioner relative to the direction of movement of said reciprocating means of said second feed means to a position in which the next selected second article is engaged by said hardware positioner;
said hardware positioner allowing movement of the next selected second article at said second receiving means in the direction in which said reciprocating means of said second feed means is advanced;
and said preventing means including:
means on said support means for preventing movement of the one type of the next selected second article at said second receiving means in the direction in which said reciprocating means of said second feed means is retracted;
and means on said hardware positioner for preventing movement of the other type of the next selected second article at said second receiving means in the direction in which said reciprocating means of said second feed means is retracted.

9. The apparatus according to claim 1 including means disposing each of said reciprocating means of said first feed means and said reciprocating means of said second feed means at its most advanced position at the end of each cycle of operation so that each of said reciprocating means of said first feed means and said reciprocating means of said second feed means is retracted during its initial movement when a new cycle of operation occurs.

10. The apparatus according to claim 1 including causing means for causing each of said first article selecting means and said second article selecting means to be effective during initial retraction of each of said reciprocating means of said first feed means and said reciprocating means of said second feed means.

11. A cyclically operated attaching apparatus for attaching complementary first and second articles of hardware to each other at a single attaching station including:
a plurality of first sources, each of said first sources having a different type of first articles;
a plurality of second sources, each of said second sources having a different type of second articles, each type of the second articles being complementary to a particular type of the first articles;
first transport means for transporting each of the first articles of one type from one of said first sources;
second transport means for transporting each of the first articles of another type from another of said first sources;
first receiving means for receiving each of the first articles from said first transport means and for receiving each of the first articles from said second transport means;
first article selecting means for selecting the next of the first articles from one of said first sources for supply to said first receiving means;
third transport means for transporting each of the second articles of one type from one of said second sources;
fourth transport means for transporting each of the second articles of another type from another of said second sources;

second receiving means for receiving each of the second articles from said third transport means and for receiving each of the second articles from said fourth transport means;

second article selecting means for selecting the next of the second articles from one of said second sources for supply to said second receiving means;

said first article selecting means and said second selecting means selecting complementary types of first and second articles;

first feed means for feeding each of the selected first articles at said first receiving means to the single attaching station by advancing each of the selected first articles from said first receiving means along a first path to the single attaching station;

said first feed means including reciprocating means movable along the first path for engaging the selected first article at said first receiving means during advancement of said reciprocating means towards the single attaching station, said reciprocating means being retracted from the single attaching station along a second path, different from the first path, so that said reciprocating means does not engage the next selected first article at said first receiving means during its retraction;

said first article selecting means being effective after said reciprocating means of said first feed means has advanced the selected first article from said first receiving means to enable the next selected first article to be received at said first receiving means from one of said first transport means and said second transport means;

second feed means for feeding each of the selected second articles at said second receiving means to the single attaching station by advancing the selected second article from said second receiving means along a third path to the single attaching station;

said second feed means including reciprocating means movable along the third path means for engaging the selected second article at said second receiving means during advancement of said reciprocating means along the third path towards the single attaching station;

and said second article selecting means being effective after said reciprocating means of said second feed means has advanced the selected second article from said second receiving means to enable the next selected second article to be received at said second receiving means from at least one of said third transport means and said fourth transport means before said reciprocating means of said second feed means reaches said second receiving means during retraction of said reciprocating means of said second feed means whereby the next selected second article is engaged by said reciprocating means of said second feed means during its retraction so that said reciprocating means moves along a fourth path, different from the third path, during at least the portion of its retraction in which the next selected second article is engaged by said reciprocating means of said second feed means.

12. The apparatus according to claim 11 including cooperating means for cooperating with said reciprocating means of said first feed means to move said reciprocating means of said first feed means to the second path during at least a portion of its retraction so that said reciprocating means of said first feed means cannot engage the next selected first article at said first receiving means during its retraction.

13. The apparatus according to claim 12 including causing means for causing each of said reciprocating means of said first feed means and said reciprocating means of said second feed means to advance and retract at the same time.

14. The apparatus according to claim 13 including:
first overlying means for overlying the selected first article at said first receiving means to prevent upward movement of the selected first article when engaged by said reciprocating means of said first feed means;
and second overlying means for overlying the selected second article at said second receiving means to prevent upward movement of the selected second article when engaged by said reciprocating means of said second feed means.

15. The apparatus according to claim 14 in which said cooperating means includes engaging means for engaging said reciprocating means of said first feed means during its retraction from the single attaching station to cause movement of said reciprocating means of said first feed means away from the first path at least during its movement past said first receiving means.

16. The apparatus according to claim 15 including;
said second overlying means preventing upward movement of the next selected second article at said second receiving means when engaged by said reciprocating means of said second feed means;
preventing means for preventing movement of the next selected second article at said second receiving means in the direction of retraction of said reciprocating means of said second feed means when engaged by said reciprocating means of said second feed means during its retraction while allowing movement of the next selected second article by said reciprocating means of said second feed means in the direction of advancement of said reciprocating means of said second feed means;
and said reciprocating means of said second feed means including a surface for cooperating with the next selected second article at said second receiving means during retraction of said reciprocating means of said second feed means to cause downward movement of said reciprocating means of said second feed means to enable said reciprocating means of said second feed means to pass beneath the next selected second article at said second receiving means during retraction of said reciprocating means of said second feed means.

17. The apparatus according to claim 16 in which:
said reciprocating means of said second feed means includes a pivotally mounted feed-in finger having an upper inclined surface as said cooperating surface;
said second feed means includes means continuously urging said pivotally mounted feed-in finger upwardly so that said upper inclined surface of said pivotally mounted feed-in finger engages the bottom of the next selected second article at said second receiving means during retraction of said pivotally mounted feed-in finger of said second feed means when the next selected second article is disposed to be engaged by said pivotally mounted feed-in finger of said second feed means during retraction of said pivotally mounted feed-in finger of said second feed means;

and limit means for limiting the upward movement of said pivotally mounted feed-in finger of said second feed means by said continuously urging means.

18. The apparatus according to claim 11 including:

a hardware positioner at said second receiving means;

support means for supporting said hardware positioner for movement relative to the direction of movement of said reciprocating means of said second feed means;

means for continuously urging said hardware positioner relative to the direction of movement of said reciprocating means of said second feed means to a position in which the next selected second article is engaged by said hardware positioner;

said hardware positioner allowing movement of the next selected second article at said second receiving means in the direction in which said reciprocating means of said second feed means is advanced;

means on said support means for preventing movement of the one type of the next selected second article at said second receiving means in the direction in which said reciprocating means of said second feed means is retracted;

and means on said hardware positioner for preventing movement of the other type of the next selected second article at said second receiving means in the direction in which said reciprocating means of said second feed means is retracted.

19. The apparatus according to claim 11 including means disposing each of said reciprocating means of said first feed means and said reciprocating means of said second feed means at its most advanced position at the end of each cycle of operation so that each of said reciprocating means of said first feed means and said reciprocating means of said second feed means is retracted during its initial movement when a new cycle of operation occurs.

20. The apparatus according to claim 11 including causing means for causing each of said first article selecting means and said second article selecting means to be effective during initial retraction of each of said reciprocating means of said first feed means and said reciprocating means of said second feed means.

* * * * *

UNITED STATES PATENT AND TRADEMARK OFFICE
CERTIFICATE OF CORRECTION

PATENT NO. : 5,339,984
DATED : August 23, 1994
INVENTOR(S) : Volker Schmidt et al It is certified that error appears in the above-identified patent and that said Letters Patent is hereby corrected as shown below:

Column 16, line 4, after "86" insert --- and ---

Column 16, line 5, cancel "and"

Signed and Sealed this

First Day of November, 1994

BRUCE LEHMAN

Attest:

Attesting Officer

Commissioner of Patents and Trademarks